United States Patent
Lukac et al.

(10) Patent No.: US 12,307,554 B2
(45) Date of Patent: May 20, 2025

(54) RECONSTRUCTING GENERAL RADIAL GRADIENTS

(71) Applicant: ADOBE INC., San Jose, CA (US)

(72) Inventors: Michal Lukac, Boulder Creek, CA (US); Souymodip Chakraborty, Bangalore (IN); Matthew David Fisher, Burlingame, CA (US); Vineet Batra, Delhi (IN); Ankit Phogat, Haryana (IN)

(73) Assignee: ADOBE INC., San Jose, CA (US)

( * ) Notice: Subject to any disclaimer, the term of this patent is extended or adjusted under 35 U.S.C. 154(b) by 275 days.

(21) Appl. No.: 18/051,648

(22) Filed: Nov. 1, 2022

(65) Prior Publication Data

US 2024/0153156 A1    May 9, 2024

(51) Int. Cl.
| | |
|---|---|
| *G06T 17/00* | (2006.01) |
| *G06T 7/90* | (2017.01) |
| *G06T 11/00* | (2006.01) |
| *G06V 10/56* | (2022.01) |
| *G06V 10/74* | (2022.01) |

(52) U.S. Cl.
CPC .............. *G06T 11/001* (2013.01); *G06T 7/90* (2017.01); *G06V 10/56* (2022.01); *G06V 10/761* (2022.01); *G06T 2207/10024* (2013.01)

(58) Field of Classification Search
CPC .................... G06T 11/001; G06T 5/80; G06T 2207/10024; G06T 7/90; G06V 10/469; G06V 10/761; G06V 10/56
See application file for complete search history.

(56) References Cited

U.S. PATENT DOCUMENTS

| | | | |
|---|---|---|---|
| 6,343,146 B1 | 1/2002 | Tsuruoka et al. | |
| 6,784,896 B1 * | 8/2004 | Perani | G06T 11/203 |
| | | | 345/589 |
| 6,879,327 B1 * | 4/2005 | Mathur | G06T 11/40 |
| | | | 345/589 |
| 2009/0244630 A1 * | 10/2009 | Miyazaki | G06T 11/001 |
| | | | 358/1.13 |

(Continued)

FOREIGN PATENT DOCUMENTS

WO    2020079355 A1    4/2020

OTHER PUBLICATIONS

2Dhariyal, et al., "An Examination of the State-of-the-Art for Multivariate Time Series Classification", In 2020 International Conference on Data Mining Workshops (ICDMW) (pp. 243-250), (Nov. 2020), IEEE.

(Continued)

*Primary Examiner* — Kee M Tung
*Assistant Examiner* — Nauman U Ahmad
(74) *Attorney, Agent, or Firm* — F. CHAU & ASSOCIATES, LLC

(57) ABSTRACT

Systems and methods for image processing are described. Embodiments of the present disclosure include receiving a raster image depicting a radial color gradient; computing a radial disk model for the radial color gradient, wherein the radial disk model defines a plurality of disks with centers aligned in a same direction; constructing a vector graphics representation of the radial color gradient based on the radial disk model; and generating a vector graphics image depicting the radial color gradient based on the vector graphics representation.

18 Claims, 15 Drawing Sheets

(56) References Cited

U.S. PATENT DOCUMENTS

2012/0288188 A1* 11/2012 Oto .................. G06T 9/20
                                                          382/164
2016/0062731 A1   3/2016  Lin et al.
2019/0102914 A1   4/2019  Stefanov
2021/0150776 A1   5/2021  Biswas et al.

OTHER PUBLICATIONS

3Favreau, et al., "Photo2ClipArt: Image Abstraction and Vectorization Using Layered Linear Gradients", ACM Transactions on Graphics, vol. 36, No. 6, Article 180. Publication date: Nov. 2017, pp. 180:1-180:11.

4Kansal, et al., "A vectorization framework for constant and linear gradient filled regions", The Visual Computer, 31(5), (2015), pp. 717-732.

5Lecot, et al., "ARDECO: Automatic Region DEtection and Conversion", In 17th Eurographics Symposium on Rendering—EGSR'06, (Jun. 2006), pp. 349-360.

6Orzan, et al., "Diffusion Curves: A Vector Representation for Smooth-Shaded Images", ACM Transactions on Graphics (TOG), 27(3), (2008), pp. 1-8.

7Sun, et al., "Image Vectorization using Optimized Gradient Meshes", ACM Transactions on Graphics (TOG), 26(3), (2007), 11-es, 7 pages.

Related to U.S. Appl. No. 17/823,574, filed Aug. 31, 2022.

Related to U.S. Appl. No. 17/901,583, filed Sep. 1, 2022.

E. Nezhadarya and R. K. Ward, "A New Scheme for Robust Gradient Vector Estimation in Color Images," in IEEE Transactions on Image Processing, vol. 20, No. 8, pp. 2211-2220, Aug. 2011, doi: 10.1109/TIP.2011.2118217. (Year: 2011).

Office Action dated Nov. 4, 2024 in related U.S. Appl. No. 17/823,574.

* cited by examiner

RECONSTRUCTING GENERAL RADIAL GRADIENTS

BACKGROUND

The following relates generally to image processing. Digital image processing refers to the use of a computer to edit a digital image using an algorithm or a processing network. Image processing software is commonly used for image editing, image reconstruction, vectorization, etc. Raster images are compiled using pixels or dots and they are resolution dependent. The quality of raster images depends on the number of pixels displayed in a certain area of the images. Vector images, on the other hand, are made up of paths or line objects that are infinitely scalable as they are not dependent on pixels. In some examples, a raster image may be converted to a vector graphics image using an image vectorization application.

Recent image vectorization systems convert a raster image to a vector graphics image and these systems are limited to trace or vectorize techniques using solid filled paths. The output image loses information and fidelity compared to the original image and is also difficult for content creators to work with. Therefore, there is a need in the art for an improved image processing system that can efficiently perform image reconstruction while preserving image details.

SUMMARY

The present disclosure describes systems and methods for image processing. Embodiments of the disclosure include an image processing apparatus configured to receive a raster image depicting a radial color gradient, compute a radial disk model for the radial color gradient including a focal point, an eccentricity vector, and color stops (and their respective positions), and generate a vector graphics image depicting the radial color gradient. The radial disk model defines a set of disks with centers aligned in a same direction from the focal point. The image processing apparatus extracts radial gradients to approximate a smoothly-shaded region of the raster image. In some examples, the image processing apparatus is configured to compute the focal point, the eccentricity vector of the radial disk model, a transform function, and color stops of the radial gradient. This way, users can easily convert the raster image to a vector graphics image (i.e., image vectorization) depicting the radial color gradient without loss of information. In addition, the generated vector graphics image avoids artifacts derived from methods such as using solid filled paths.

A method, apparatus, and non-transitory computer readable medium for image processing are described. One or more embodiments of the method, apparatus, and non-transitory computer readable medium include receiving a raster image depicting a radial color gradient; computing a radial disk model for the radial color gradient, wherein the radial disk model defines a plurality of disks with centers aligned in a same direction; constructing a vector graphics representation of the radial color gradient based on the radial disk model; and generating a vector graphics image depicting the radial color gradient based on the vector graphics representation.

A method, apparatus, and non-transitory computer readable medium for image processing are described. One or more embodiments of the method, apparatus, and non-transitory computer readable medium include receiving a raster image depicting a radial color gradient; computing a focal point of a radial disk model for the radial color gradient, wherein the radial disk model defines a plurality of disks with centers aligned in a same direction from the focal point; computing an eccentricity vector of the radial disk model, wherein the eccentricity vector defines a relationship between a center of each of the plurality of disks and a corresponding radius; and constructing a vector graphics representation of the radial color gradient based on the focal point and the eccentricity vector.

An apparatus and method for image processing are described. One or more embodiments of the apparatus and method include a processor; a memory including instructions executable by the processor; a radial disk generation component configured to compute a radial disk model for a radial color gradient, wherein the radial disk model defines a plurality of disks with centers aligned in a same direction; a vector graphics representation component configured to construct a vector graphics representation of the radial color gradient based on the radial disk model; and an image generation component configured to generate a vector graphics image depicting the radial color gradient based on the vector graphics representation.

DETAILED DESCRIPTION

Figure 1:
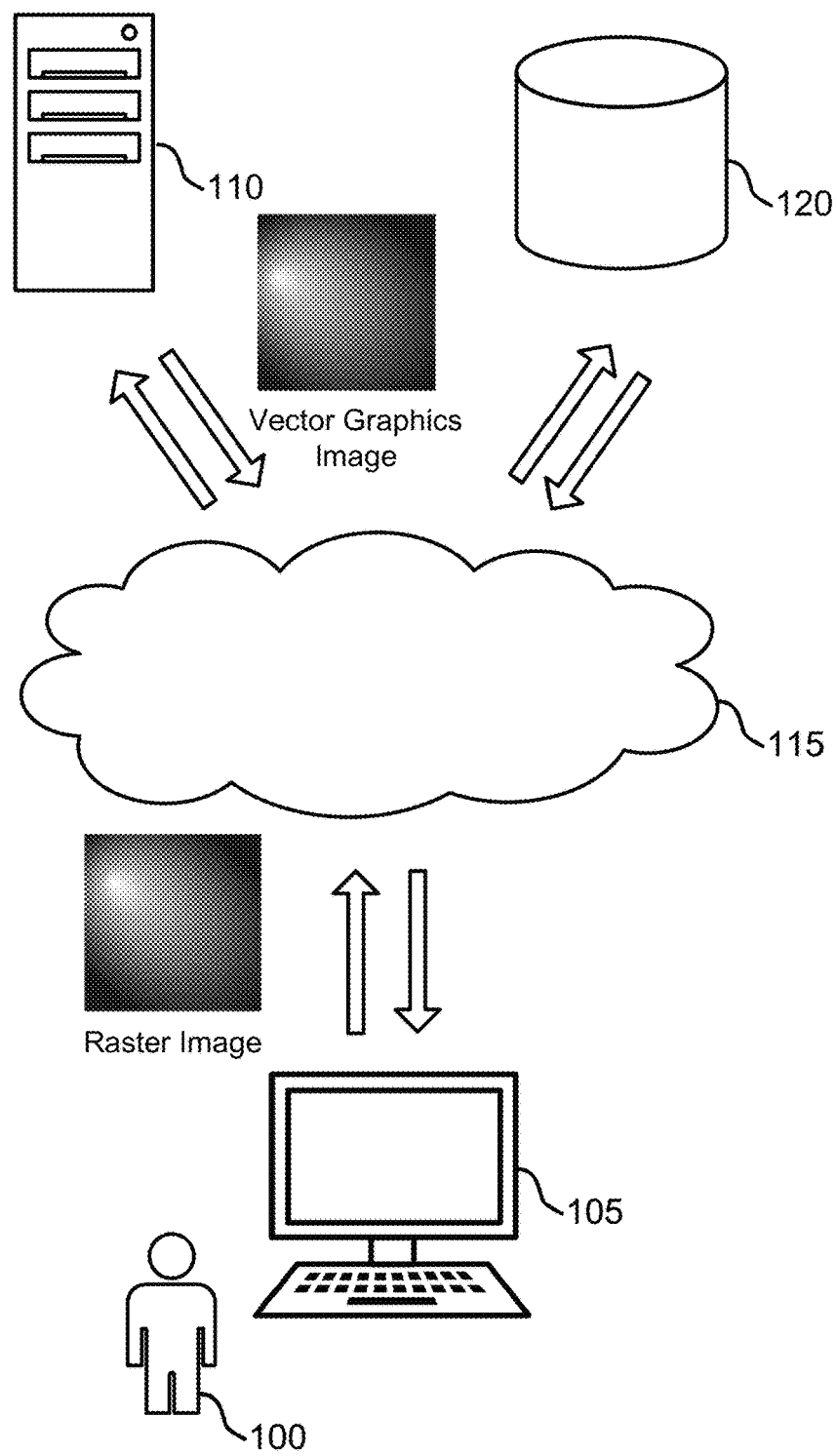
FIG. 1 shows an example of an image processing system according to embodiments of the present disclosure.

The present disclosure describes systems and methods for image processing. Embodiments of the disclosure include an image processing apparatus configured to receive a raster image depicting a radial color gradient, compute a radial disk model for the radial color gradient including a focal point, an eccentricity vector and color stops (and their respective positions), and generate a vector graphics image depicting the radial color gradient. The radial disk model defines a set of disks with centers aligned in a same direction from the focal point. The image processing apparatus extracts radial gradients to approximate a smoothly-shaded region of a raster image. In some examples, the image processing apparatus is configured to compute the focal point, the eccentricity vector of the radial disk model, a transform function, and color stops of the radial gradient. This way, users can easily convert the raster image to a vector graphics image (i.e., image vectorization) depicting the radial color gradient without loss of information. In addition, users avoid artifacts derived from methods such as using solid filled paths.

Recently, image vectorization techniques have been used for converting a raster image to a vector graphics image. Conventional image editing systems often generate solid filled paths when reconstructing a vector graphics image from a raster image. The color transition between two paths of the solid filled paths is obvious to the eye (e.g., lacks smooth color transition among regions of different colors) and the output image loses information and fidelity compared to the original image. In some examples, conventional systems depend on gradient meshes or diffusion curves for the reconstruction of certain regions. Additionally, content creators have a difficult time editing the output image due to the use of excessive geometry or intermediary line objects.

Embodiments of the present disclosure include an image processing apparatus configured to receive a raster image and extract radial gradients based on the raster image to approximate a vector graphics image including smoothly-shaded regions. The image processing apparatus is configured to generate a vector graphics representation including a radial disk model for a radial color gradient and a color stop point. In some examples, a general radial gradient is defined by a focal point, an eccentricity vector, and a color stop.

In some embodiments, the image processing apparatus receives a raster image depicting a radial color gradient. The image processing apparatus identifies a direction of change of color intensity in a superpixel (e.g., a 2D region in space including a closed complete set of points). The image processing apparatus computes a first color gradient corresponding to a first color channel, a second color gradient corresponding to a second color channel, and a third color gradient corresponding to a third color channel. The image processing apparatus computes a vector field of color gradients that defines the direction of change in color intensity incorporating the first color gradient, the second color gradient, and the third color gradient.

The image processing apparatus of the present disclosure performs image vectorization by computing a radial disk model for a radial color gradient and a color stop to obtain a vector graphics image including smoothly-shaded regions. The radial disk model includes a focal point such that centers of a set of disks are aligned in a same direction from the focal point. Additionally, the radial disk model includes an eccentricity vector corresponding to a quotient of a difference between the centers of the disks and a difference between corresponding radii of the disks. The eccentricity vector indicates a direction and speed of the disks that spread outward. With regards to general radial gradient, colors emerge from the focal point and smoothly spread outward in a circular shape. The image processing apparatus can efficiently perform image reconstruction by reconstructing radial gradients based on a raster image while preserving image details.

In some cases, the image processing apparatus computes a transform function representing a scaling of the radial disk model, a rotation of the radial disk model, or both. The vector graphics representation is constructed based on the transform function. The transform function (e.g., linear transformation) converts an unrotated space into an observable image space. According to an embodiment, the transform function is based on the focal point and the eccentricity vector. Using linear transformation, a color gradient in a first space is mapped to a color gradient in a second space. In some examples, the image processing apparatus computes radial gradient parameters (e.g., radius of a disk) using optimization methods such as a mis-alignment energy function. The mis-alignment energy function is defined to quantify a difference between the constructed gradient and the observed gradient. The image processing apparatus estimates values of the radial gradient parameters by optimizing a least square error (LSE) of the mis-alignment energy function.

In some embodiments, the image processing apparatus identifies the color stops of the radial gradients and corresponding positions with respect to the focal point, the eccentricity vector, the transform function, and origin of transform. The points that lie on a boundary of the same disk share same color values. The image processing apparatus identifies a color intensity function with respect to a radial distance from a center of a disk of the set of disks. The image processing apparatus identifies a transition point in the color intensity function. The image processing apparatus generates a color stop based on the transition point. In some examples, colors between two color stops are a blend of the colors at the corresponding stops. The image processing apparatus computes a weight value based on the radial disk model, where the color intensity function is computed based on the weight value. The weight value assigns larger values of importance to points that are in a direction of eccentricity and smaller values of importance to points in an opposite direction. The image processing apparatus constructs a vector graphics representation of the radial color gradient based on the radial disk model and the color stops. Accordingly, the image processing apparatus generates a vector graphics image based on the vector graphics representation.

Embodiments of the present disclosure may be used in the context of image vectorization applications. For example, an image processing network based on the present disclosure may take a raster image and efficiently generate a vector graphics image that depicts a general radial color gradient (i.e., colors emerge from a focal point and smoothly spread outward in a circular shape). Methods for estimating parameters of general radial gradient and generating color stops are provided in the present disclosure. An example application, according to some embodiments, is provided with reference to FIG. 4. Details regarding the architecture of an example image processing apparatus are provided with reference to FIGS. 1-3. Example processes for image processing are provided with reference to FIGS. 5-15.

Network Architecture

Figure 2:
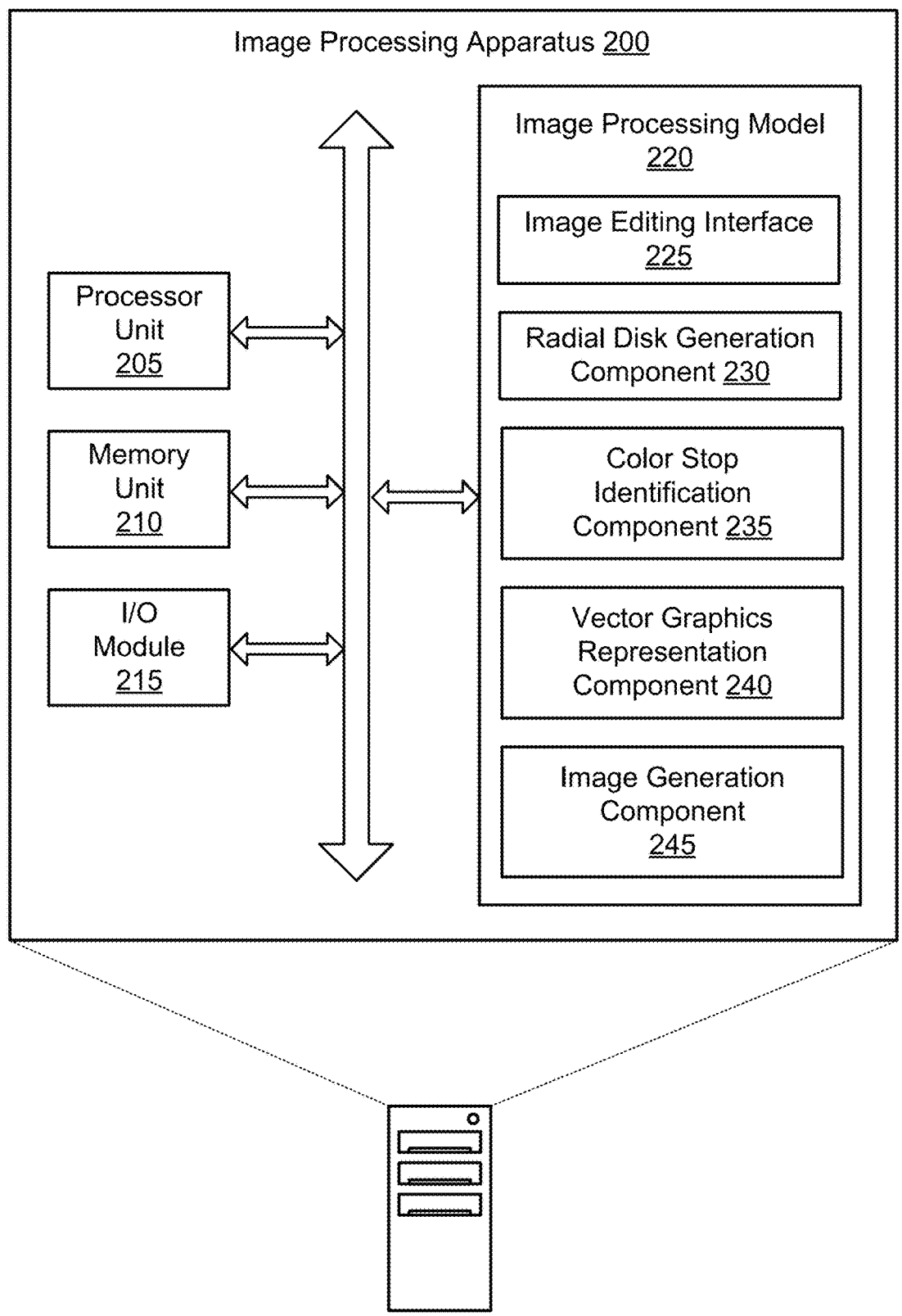
FIG. 2 shows an example of an image processing apparatus according to embodiments of the present disclosure.
Figure 3:
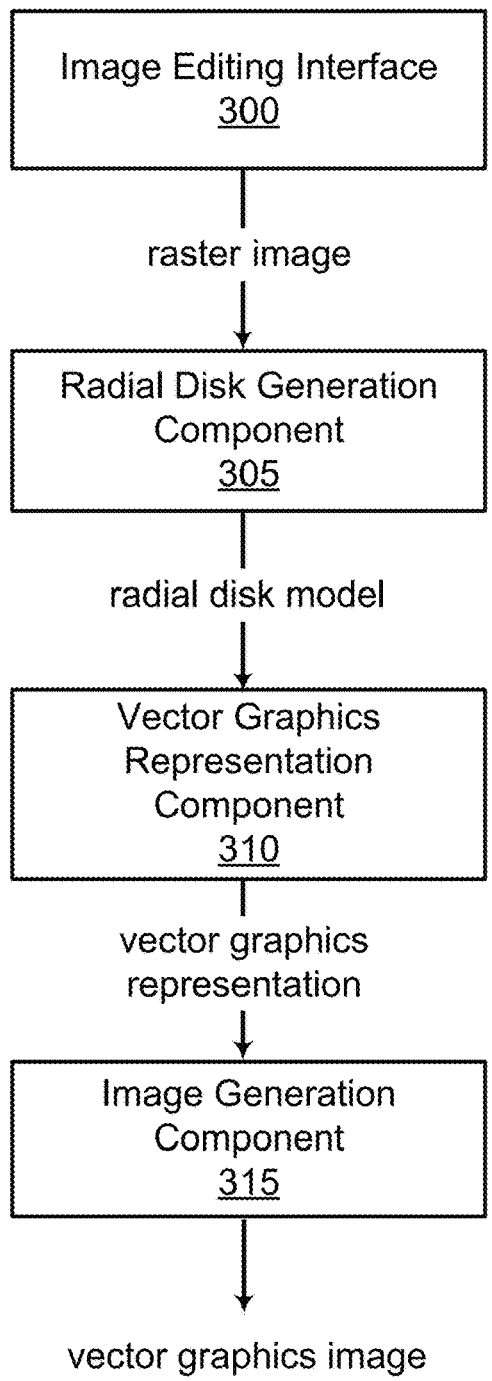
FIG. 3 shows an example of an image processing model according to embodiments of the present disclosure.

In FIGS. 1-3, an apparatus and method for image processing is described. One or more embodiments of the apparatus and method include a processor; a memory including instructions executable by the processor; a radial disk generation component configured to compute a radial disk model for a radial color gradient, wherein the radial disk model defines a plurality of disks with centers aligned in a same direction; a vector graphics representation component configured to construct a vector graphics representation of the radial color gradient based on the radial disk model; and an image generation component configured to generate a vector graphics image depicting the radial color gradient based on the vector graphics representation.

In some embodiments, the radial disk model comprises a focal point, an eccentricity vector, a transform function, or any combination thereof. Some examples of the apparatus and method further include a color stop identification component configured to compute a color stop based on a color intensity function with respect to a radial distance from a center of a disk of the plurality of disks. Some examples of the apparatus and method further include an image editing interface configured to receive a raster image depicting the radial color gradient.

FIG. 1 shows an example of an image processing system according to embodiments of the present disclosure. The example shown includes user 100, user device 105, image processing apparatus 110, cloud 115, and database 120. Image processing apparatus 110 is an example of, or includes aspects of, the corresponding element described with reference to FIGS. 2, 3, and 5.

As an example shown in FIG. 1, user 100 uploads a raster image to image processing apparatus 110 via e.g., user device 105 and cloud 115. The raster image includes a number of pixels and depicts a radial color gradient. In some cases, content designers can create smooth shaded graphics based on gradients. For example, user 100 may create a vector graphics image including color gradients based on the uploaded raster image using image processing apparatus 110.

Image processing apparatus 110 generates a vector graphics representation based on the raster image by constructing a vector graphics representation of the radial color gradient. Image processing apparatus 110 computes a radial disk model for the radial color gradient that includes a focal point, an eccentricity vector, and a transform function. The radial disk model defines a set of disks with centers aligned in a same direction. Image processing apparatus 110 then constructs color stops and their respective positions. Image processing apparatus 110 generates a vector graphics image depicting the radial color gradient based on the vector graphics representation.

The vector graphics image depicts a smoothly-shaded region of the raster image with colors that emerge from the focal point and spread outward. In some cases, the vector graphics image may be defined by the focal point, an eccentricity vector, a transform function, and color stops. Image processing apparatus 110 returns the vector graphics image to user 100 via cloud 115 and user device 105. The process of using image processing apparatus 110 is further described with reference to FIG. 4.

User interface may enable user 100 to interact with a device. In some embodiments, a user interface may include an audio device, such as an external speaker system, an external display device such as a display screen, or an input device (e.g., remote control device interfaced with the user interface directly or through an I/O controller module). In some cases, a user interface may be a graphical user interface (GUI). In some embodiments, user 100 uploads the raster image via the user interface.

User device 105 may be a personal computer, laptop computer, mainframe computer, palmtop computer, personal assistant, mobile device, or any other suitable processing apparatus. In some examples, user device 105 includes software that incorporates an image processing application (e.g., an image editing application). The image editing application may either include or communicate with image processing apparatus 110. In some examples, the image vectorization application on user device 105 may include functions of image processing apparatus 110.

Image processing apparatus 110 includes a computer implemented network comprising an image editing interface, radial disk generation component, color stop identification component, vector graphics representation component, and image generation component. Image processing apparatus 110 may also include a processor unit, a memory unit, and an I/O module. Additionally, image processing apparatus 110 can communicate with database 120 via cloud 115. In some cases, the architecture of the image processing network is also referred to as a network or a network model. Further detail regarding the architecture of image processing apparatus 110 is provided with reference to FIGS. 1-3. Further detail regarding the operation of image processing apparatus 110 is provided with reference to FIGS. 4-15.

In some cases, image processing apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user interacts with database controller. In other cases, database controller may operate automatically without user interaction.

FIG. 2 shows an example of an image processing apparatus 200 according to embodiments of the present disclosure. The example shown includes image processing apparatus 200 that comprises processor unit 205, memory unit 210, I/O module 215, and image processing model 220. In one embodiment, image processing model 220 includes image editing interface 225, radial disk generation component 230, color stop identification component 235, vector graphics representation component 240, and image generation component 245. Image processing apparatus 200 is an example of, or includes aspects of, the corresponding element described with reference to FIG. 1. Image processing model 220 is an example of, or includes aspects of, the corresponding element described with reference to FIG. 3.

Image processing apparatus 200 is an example of, or includes embodiments of, the corresponding element described with reference to FIG. 1. According to an embodiment, image processing apparatus 200 includes processor unit 205, memory unit 210, I/O module 215, and image processing model 220. Image processing apparatus 200 performs image vectorization on a raster image that contains one or more smoothly-shaded regions. Image processing apparatus 200 can be used for radial gradients having scaling and rotational transform with any number of stops. Image processing apparatus 200 efficiently performs image reconstruction by reconstructing radial gradients based on the raster image while preserving image details.

Processor unit 205 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 205 is configured to operate a memory array using a memory controller. In other cases, a memory controller is integrated into processor unit 205. In some cases, processor unit 205 is configured to execute computer-readable instructions stored in a memory to perform various functions. In some embodiments, processor unit 205 includes special purpose components for modem processing, baseband processing, digital signal processing, or transmission processing.

Examples of memory unit 210 include random access memory (RAM), read-only memory (ROM), or a hard disk. Examples of memory unit 210 include solid state memory and a hard disk drive. In some examples, memory unit 210 is used to store computer-readable, computer-executable software including instructions that, when executed, cause a processor to perform various functions described herein. In some cases, memory unit 210 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within memory unit 210 store information in the form of a logical state.

I/O module 215 includes an I/O controller. The I/O controller may manage input and output signals for a device. The I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an I/O controller.

In some examples, I/O module 215 includes a user interface. A user interface may enable a user to interact with a device. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

Image processing model 220 is an example of, or includes embodiments of, the corresponding element described with reference to FIG. 5. In one embodiment, image processing model 220 includes image editing interface 225, radial disk generation component 230, color stop identification component 235, vector graphics representation component 240, and image generation component 245.

According to an embodiment, image processing model 220 computes a radial disk model for the radial color gradient including a focal point, an eccentricity vector, and color stops. Image processing model 220 generates a vector graphics representation based on the raster image by identifying a focal point, an eccentricity vector, and two or more color stops. Image processing model 220 generates a vector graphics image based on the focal point, eccentricity vector, and color stops. The vector graphics image depicts colors that emerge from the focal point and smoothly spread outward in a circular shape. In some examples, the vector graphics image may be defined by a center point, an ending shape, and color stop points.

According to some embodiments, image editing interface 225 receives the raster image depicting the radial color gradient. In some examples, image editing interface 225 receives a user input which is the raster image. In some examples, image editing interface 225 receives a command from the user to convert the raster image to the vector graphics image, where the vector graphics image is generated based on the command. In some examples, image editing interface 225 displays the vector graphics image depicting the radial color gradient based on the vector graphics representation. Image editing interface 225 is an example of, or includes aspects of, the corresponding element described with reference to FIGS. 3 and 7.

According to some embodiments, radial disk generation component 230 computes a radial disk model for the radial color gradient, where the radial disk model defines a set of disks with centers aligned in a same direction. Radial disk generation component 230 modifies the radial disk model based on the user input. In some examples, radial disk generation component 230 computes the focal point of the radial disk model, where the centers of the set of disks are aligned in the same direction from the focal point. In some examples, radial disk generation component 230 computes the eccentricity vector of the radial disk model, where the eccentricity vector corresponds to a quotient of a difference between the centers of the set of disks and a difference between corresponding radii of the set of disks. In some examples, radial disk generation component 230 computes a transform function representing a scaling of the radial disk model, a rotation of the radial disk model, or both, where the vector graphics representation is constructed based on the transform function.

In some examples, radial disk generation component 230 computes a color gradient of the raster image. Radial disk generation component 230 computes an error value based on the color gradient and the radial disk model. Radial disk generation component 230 optimizes the radial disk model based on the error value.

In some examples, radial disk generation component 230 computes a first color gradient corresponding to a first color channel of a set of color channels. Radial disk generation component 230 computes a second color gradient corresponding to a second color channel of the set of color channels. Radial disk generation component 230 computes a third color gradient corresponding to a third color channel of the set of color channels, where the error value is based on the first color gradient, the second color gradient, and the third color gradient.

In some examples, radial disk generation component 230 computes a vector field of color gradients including the color gradient, where the error value is based on the vector field of color gradients. In some examples, radial disk generation component 230 computes an energy function based on the color gradient and the radial disk model, where the error value corresponds to a least square error (LSE) of the energy function. According to some embodiments, the radial disk model includes the focal point, the eccentricity vector, the transform function, or any combination thereof. Radial disk generation component 230 is an example of, or includes aspects of, the corresponding element described with reference to FIG. 3.

According to some embodiments, color stop identification component 235 computes a color intensity function with respect to a radial distance from a center of a disk of the set of disks. Color stop identification component 235 identifies a transition point in the color intensity function. Color stop identification component 235 generates a color stop based on the transition point, where the vector graphics representation is constructed based on the color stop. In some examples, color stop identification component 235 computes a weight value based on the radial disk model, where the color intensity function is computed based on the weight value.

According to some embodiments, color stop identification component 235 is configured to compute a color stop based on a color intensity function with respect to a radial distance from a center of a disk of the plurality of disks. Color stop identification component 235 is an example of, or includes aspects of, the corresponding element described with reference to FIGS. 6, 7, and 13.

According to some embodiments, vector graphics representation component 240 constructs a vector graphics representation of the radial color gradient based on the radial disk model that includes the focal point and the eccentricity vector. Vector graphics representation component 240 is an example of, or includes aspects of, the corresponding element described with reference to FIG. 3.

According to some embodiments, image generation component 245 generates a vector graphics image depicting the radial color gradient based on the vector graphics representation. In some examples, image generation component 245 generates an updated vector graphics image based on a modified radial disk model. Image generation component 245 is an example of, or includes aspects of, the corresponding element described with reference to FIG. 3.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

FIG. 3 shows an example of an image processing model according to embodiments of the present disclosure. Details regarding components of the image processing model are also described in FIG. 2. The example shown includes image editing interface 300, radial disk generation component 305, vector graphics representation component 310, and image generation component 315. According to an embodiment of the present disclosure, the image processing model is configured to extract general radial gradients to approximate a smoothly-shaded region of a raster image.

As an example shown in FIG. 3, from top to bottom, image editing interface 300 receives a raster image (e.g., from a user), which is input to radial disk generation component 305. Image editing interface 300 is an example of, or includes embodiments of, the corresponding element described with reference to FIGS. 2 and 7. Radial disk generation component 305 computes a radial disk model for a radial color gradient, wherein the radial disk model includes a focal point, an eccentricity vector, and a transform function. For example, the radial disk model defines a set of disks with centers aligned in a same direction from the focal point. Radial disk generation component 305 is an example of, or includes aspects of, the corresponding element described with reference to FIG. 2.

Vector graphics representation component 310 constructs a vector graphics representation of the radial color gradient based on the radial disk model. Vector graphics representation component 310 is an example of, or includes aspects of, the corresponding element described with reference to FIG. 2. Image generation component 315 generates a vector graphics image depicting the radial color gradient based on the vector graphics representation. Image generation component 315 is an example of, or includes aspects of, the corresponding element described with reference to FIG. 2.

Image Processing

In FIGS. 4-15, a method, apparatus, and non-transitory computer readable medium for image processing is described. One or more embodiments of the method include receiving a raster image depicting a radial color gradient; computing a radial disk model for the radial color gradient, wherein the radial disk model defines a plurality of disks with centers aligned in a same direction; constructing a vector graphics representation of the radial color gradient based on the radial disk model; and generating a vector graphics image depicting the radial color gradient based on the vector graphics representation.

Some examples of the method, apparatus, and non-transitory computer readable medium further include computing a focal point of the radial disk model, wherein the centers of the plurality of disks are aligned in the same direction from the focal point.

Some examples of the method, apparatus, and non-transitory computer readable medium further include computing an eccentricity vector of the radial disk model, wherein the eccentricity vector corresponds to a quotient of a difference between the centers of the plurality of disks and a difference between corresponding radii of the plurality of disks.

Some examples of the method, apparatus, and non-transitory computer readable medium further include computing a transform function representing a scaling of the radial disk model, a rotation of the radial disk model, or both, wherein the vector graphics representation is constructed based on the transform function.

Some examples of the method, apparatus, and non-transitory computer readable medium further include computing a color gradient of the raster image. Some examples further include computing an error value based on the color gradient and the radial disk model. Some examples further include optimizing the radial disk model based on the error value.

Some examples of the method, apparatus, and non-transitory computer readable medium further include computing a first color gradient corresponding to a first color channel of a plurality of color channels. Some examples further include computing a second color gradient corresponding to a second color channel of the plurality of color channels. Some examples further include computing a third color gradient corresponding to a third color channel of the plurality of color channels, wherein the error value is based on the first color gradient, the second color gradient, and the third color gradient.

Some examples of the method, apparatus, and non-transitory computer readable medium further include computing a vector field of color gradients including the color gradient, wherein the error value is based on the vector field of color gradients.

Some examples of the method, apparatus, and non-transitory computer readable medium further include computing an energy function based on the color gradient and the radial disk model, wherein the error value corresponds to a least square error (LSE) of the energy function.

Some examples of the method, apparatus, and non-transitory computer readable medium further include computing a color intensity function with respect to a radial distance from a center of a disk of the plurality of disks. Some examples further include identifying a transition point in the color intensity function. Some examples further include generating a color stop based on the transition point, wherein the vector graphics representation is constructed based on the color stop.

Some examples of the method, apparatus, and non-transitory computer readable medium further include computing a weight value based on the radial disk model, wherein the color intensity function is computed based on the weight value.

Some examples of the method, apparatus, and non-transitory computer readable medium further include receiving a user input. Some examples further include modifying the radial disk model based on the user input. Some examples further include generating an updated vector graphics image based on the modified radial disk model.

A method, apparatus, and non-transitory computer readable medium for image processing is described. One or more embodiments of the method include receiving a raster image depicting a radial color gradient; computing a focal point of a radial disk model for the radial color gradient, wherein the radial disk model defines a plurality of disks with centers aligned in a same direction from the focal point; computing an eccentricity vector of the radial disk model, wherein the eccentricity vector defines a relationship between a center of each of the plurality of disks and a corresponding radius; and constructing a vector graphics representation of the radial color gradient based on the focal point and the eccentricity vector.

Some examples of the method, apparatus, and non-transitory computer readable medium further include displaying a vector graphics image depicting the radial color gradient based on the vector graphics representation.

Some examples of the method, apparatus, and non-transitory computer readable medium further include computing a transform function representing a scaling of the radial disk model, a rotation of the radial disk model, or both, wherein the vector graphics representation is constructed based on the transform function.

Some examples of the method, apparatus, and non-transitory computer readable medium further include computing a color gradient of the raster image. Some examples further include computing an error value based on the color gradient and the radial disk model. Some examples further include optimizing the radial disk model based on the error value.

Some examples of the method, apparatus, and non-transitory computer readable medium further include computing a color intensity function with respect to a radial distance from a center of a disk of the plurality of disks. Some examples further include identifying a transition point in the color intensity function. Some examples further include generating a color stop based on the transition point, wherein the vector graphics representation is constructed based on the color stop.

Figure 4:
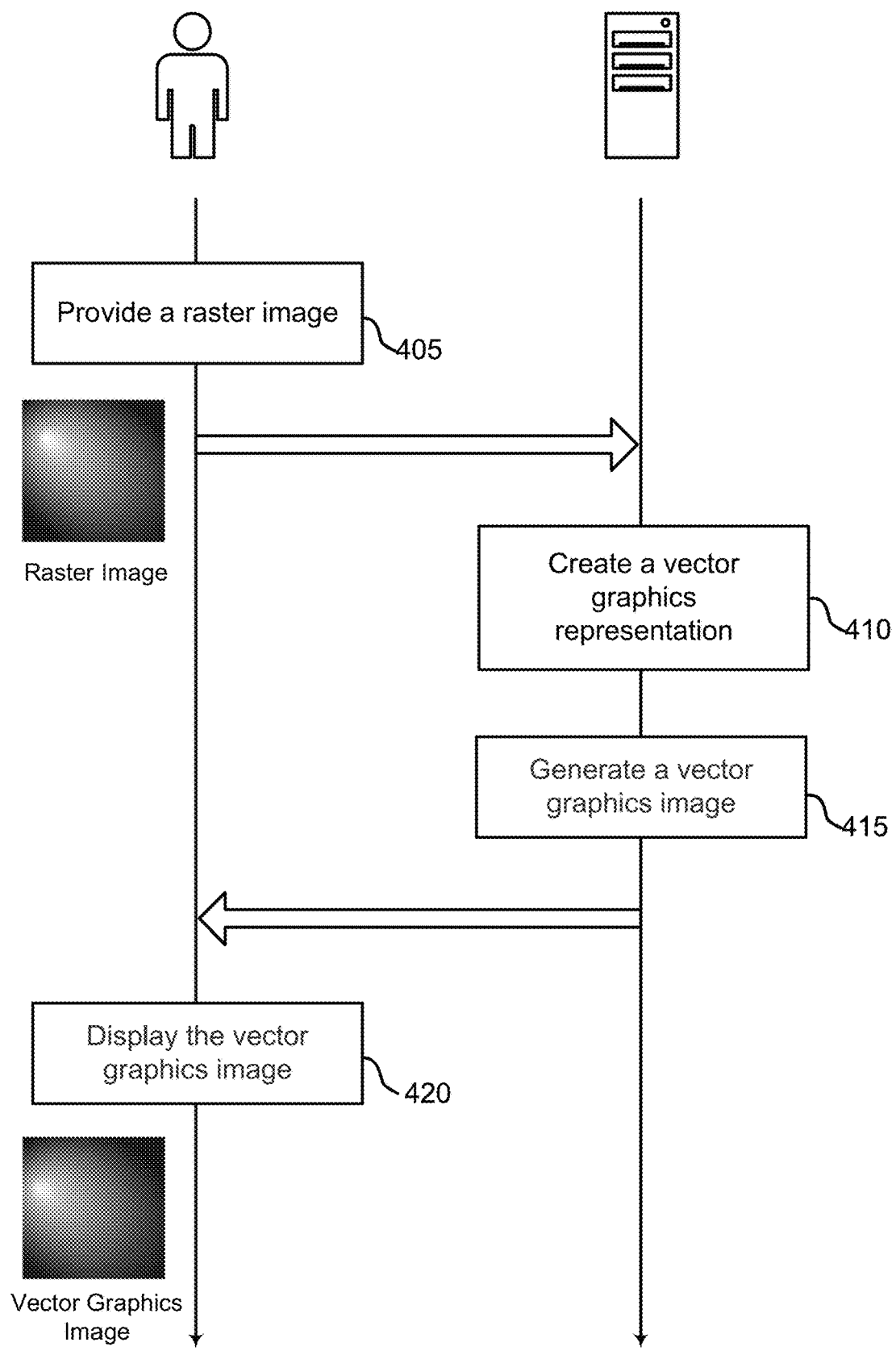
FIG. 4 shows an example of a method for image vectorization according to embodiments of the present disclosure.

FIG. 4 shows an example of image vectorization according to embodiments of the present disclosure. In some examples, these operations are performed by a system including a processor executing a set of codes to control functional elements of an apparatus, such as image processing apparatus 200 as shown in FIG. 2. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 405, the user provides a raster image. In some cases, the operations of this step refer to, or may be performed by, a user as described with reference to FIG. 1. For example, the user is an image editor and wants to have a smoothly-shaded vector graphics image using image processing apparatus 200 as in FIG. 2.

At operation 410, the system creates a vector graphics representation based on the raster image. In some cases, the operations of this step refer to, or may be performed by, an image processing apparatus as described with reference to FIGS. 1 and 2. In some examples, the image processing apparatus is configured to perform image vectorization to reconstruct a vector graphics image from a raster image by computing a radial disk model. The radial disk model includes a focal point, an eccentricity vector, a transform function, and the image processing apparatus generates color stops (and their respective positions).

At operation 415, the system generates a vector graphics image based on the vector graphics representation. In some cases, the operations of this step refer to, or may be performed by, an image processing apparatus as described with reference to FIGS. 1 and 2. In some cases, the process of converting a raster image to a vector graphics image is referred to as vectorization.

At operation 420, the system displays the vector graphics image to the user. In some cases, the operations of this step refer to, or may be performed by, a user as described with reference to FIG. 1. The vector graphics image depicts a smoothly-shaded region of the raster image. The user can edit the vector graphics image to modify color in different areas, e.g., via an image editing interface.

Figure 5:
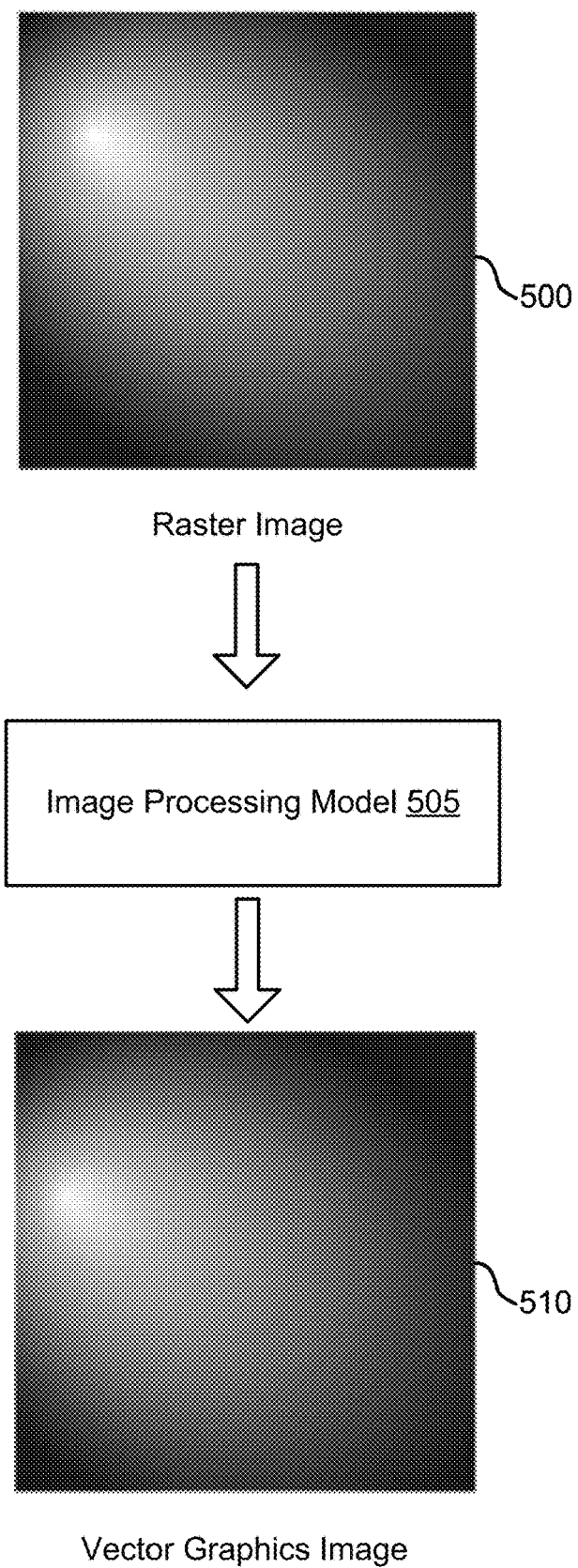
FIG. 5 shows an example of general radial gradient reconstruction according to embodiments of the present disclosure.

FIG. 5 shows an example of general radial gradient reconstruction according to embodiments of the present disclosure. The example shown includes raster image 500, image processing model 505, and vector graphics image 510. Image processing model 505 converts raster image 500 to vector graphics image 510. For example, a raster image is characterized by the width and height of the image in pixels and by the number of bits per pixel. In some examples, raster image 500 is stored in image files with varying image formats (e.g., jpg, png, etc.). Raster image 500 is an example of, or includes aspects of, the corresponding element described with reference to FIG. 7.

According to an embodiment, image processing model 505 generates vector graphics image 510 based on raster image 500 by constructing a radial disk model that includes a focal point, an eccentricity vector, and a transform function. Additionally, image processing model 505 generates color stops and the locations of the color stops. As seen in FIG. 5, the color gradient is elliptical and color rings are not concentric. Image processing model 505 is an example of, or includes aspects of, the corresponding element described with reference to FIG. 2.

As an example shown in FIG. 5, the vector graphics image 510 looks substantially similar compared to raster image 500 in terms of shading and change of colors. For example, a vector graphics image refers to images generated from geometric shapes defined on a cartesian plane, using points, lines, curves, polygons, or any combination thereof. Gradients are used as coloring constructs for vector graphics. The use of gradients enables smoothly-shaded graphics such as vector graphics image 510. In some examples, via reconstructing general radial gradients, colors emerge from a center point (e.g., a focal point) and smoothly spread outward (e.g., in circular shape). Vector graphics image 510 is an example of, or includes aspects of, the corresponding element described with reference to FIGS. 6 and 7.

Figure 6:
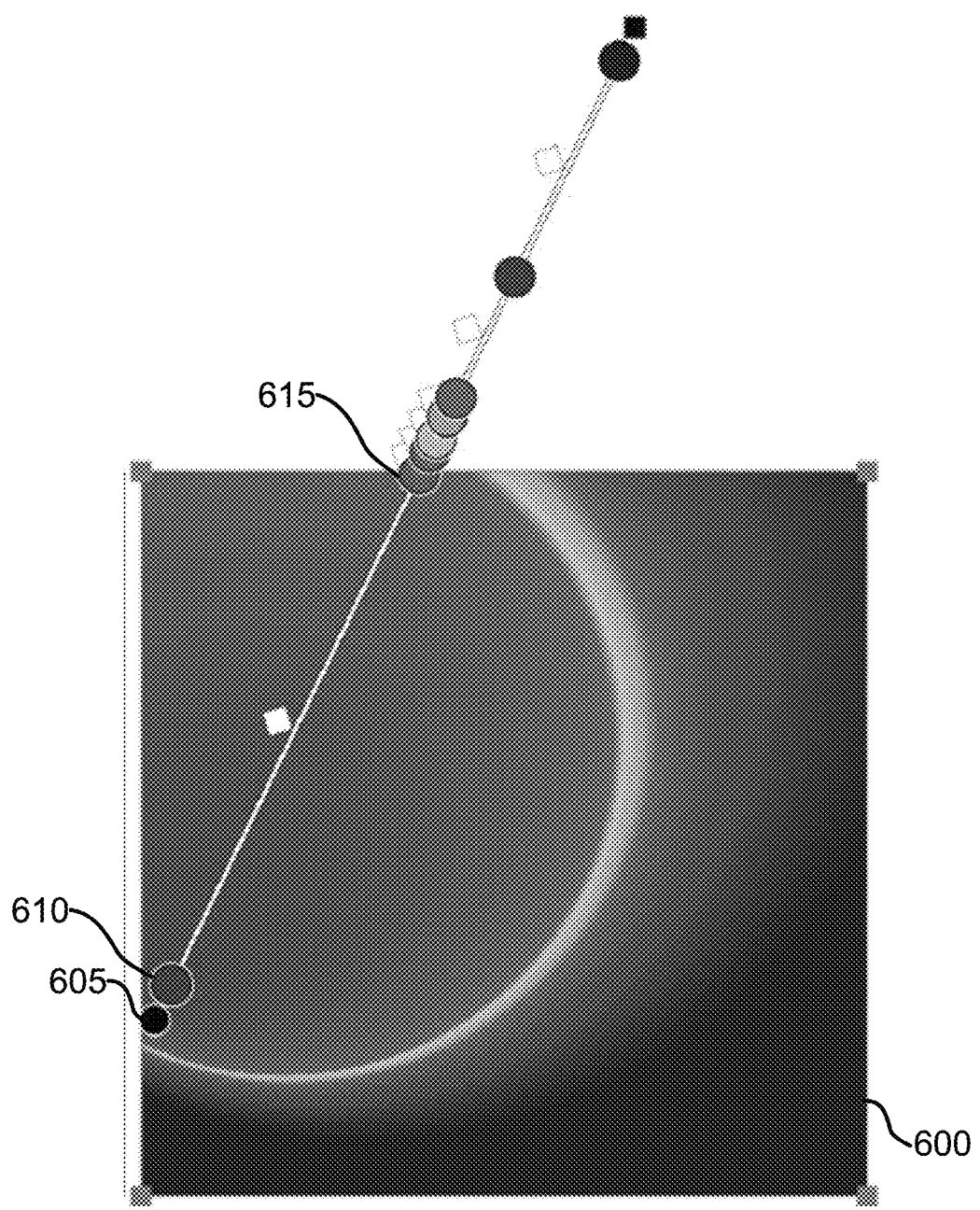
FIG. 6 shows an example of extracting concentric radial gradient from an image according to embodiments of the present disclosure.

FIG. 6 shows an example of extracting a radial gradient from an image according to embodiments of the present disclosure. The example shown includes vector graphics image 600, focal point 605, first color stop 610, and second color stop 615. FIG. 6 shows results of image vectorization based on at least focal point 605, first color stop 610, and second color stop 615. Image processing model 220 with regards to FIG. 2 generates smoothly-shaded vector graphics based on a vector graphics representation. The vector graphics representation includes or is based on a radial disk model for a radial color gradient and color stops. Vector graphics image 600 is an example of, or includes aspects of, the corresponding element described with reference to FIGS. 5 and 7.

According to an embodiment, focal point 605 is defined as the position of the inner most radial circle or ellipse. Focal point 605 is a point from which colors emanate radially outward. In some cases, focal point is defined as a point disk with a center and radius equal to zero. For example, a radial gradient can include disks of color that seem to grow from a focal point with each disk having a different radius. Focal point 605 is an example of, or includes aspects of, the corresponding element described with reference to FIGS. 7, 9, and 10.

The radial disks are colored based on first color stop 610 and second color stop 615. In some examples, first color stop 610 and second color stop 615 are positioned on an imaginary gradient axis. First color stop 610 is an example of, or includes aspects of, the corresponding element described with reference to FIG. 7. Second color stop 615 is an example of, or includes aspects of, the corresponding element described with reference to FIG. 7.

According to an embodiment of the disclosure, colors emerge from a single point and smoothly spread outward in a circular shape via reconstruction of general radial gradients. In some cases, a general radial gradient is defined based on a set of parameters that include a focal point, a center, outer radius of the outermost circle, scale and rotation applied with regards to the center. Colors do not vary outside the outermost circle. In some examples, the transformation can change a circle to an ellipse. The process of converting an image to vector graphics may be referred to as vectorization.

Figure 7:
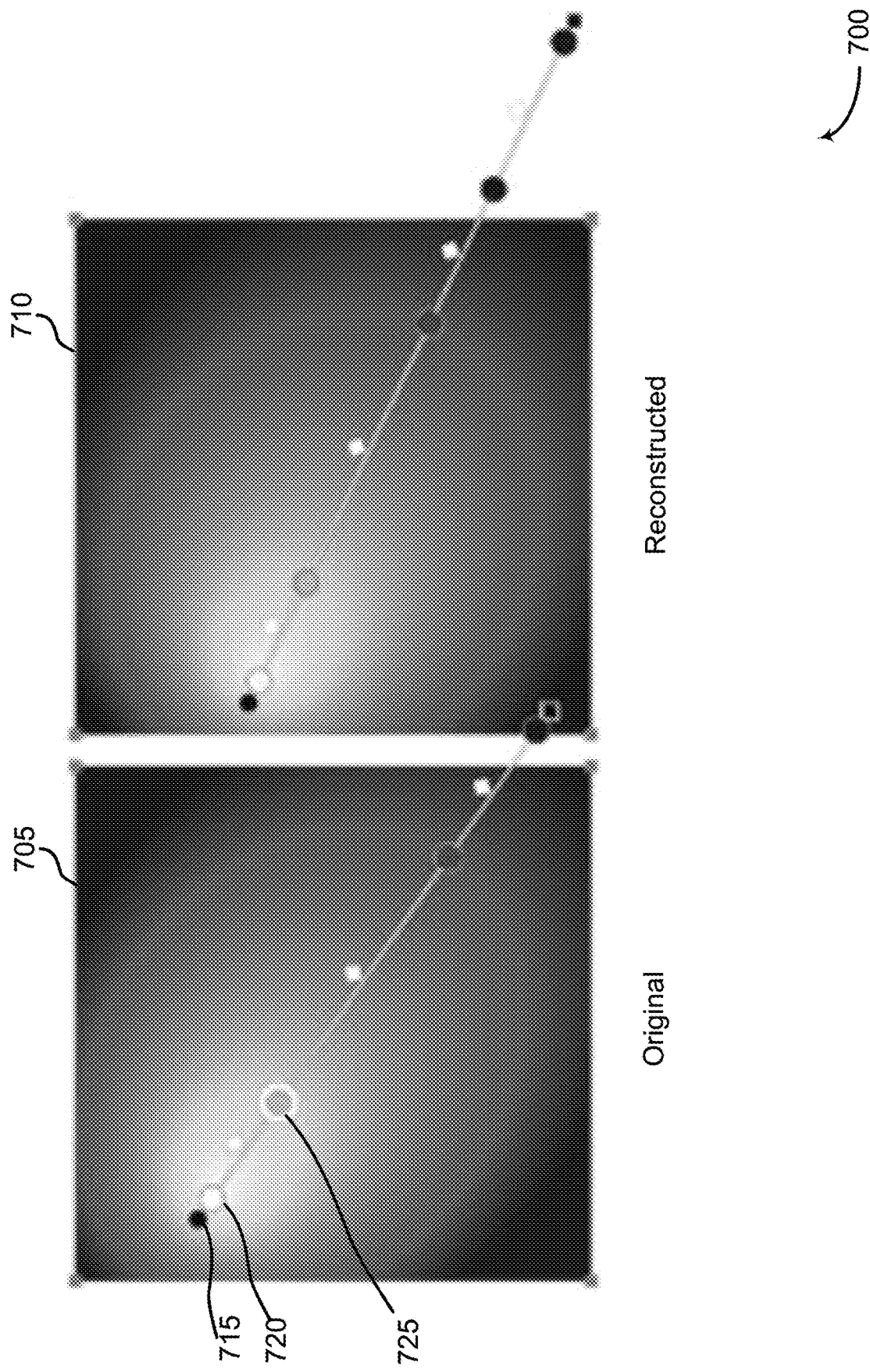
FIG. 7 shows an example of an image editing interface according to embodiments of the present disclosure.

FIG. 7 shows an example of an image editing interface according to embodiments of the present disclosure. The example shown includes image editing interface 700, raster image 705, vector graphics image 710, focal point 715, first color stop 720, and second color stop 725. Image editing interface 700 takes a raster image as input. Image processing model 220 as shown in FIG. 2 computes a radial disk model that estimates parameters of a general radial gradient to approximate a smoothly-shaded region of the raster image. Colors can emerge from a single point and smoothly spread outward. The radial disk model includes a focal point such that colors emanate radially outward from the focal point. Additionally, the centers of a set of disks are aligned in a same direction from the focal point.

As an example shown in FIG. 7, parameters of a general radial gradient are extracted to approximate a smoothly-shaded region of a raster image. The raster image may be of arbitrary shape. The region is denoted as a superpixel. In some cases, the color field of the superpixel can be estimated by accurately fitting a general radial gradient. The extracted color gradients are used in the vectorization process to reconstruct a vector graphics image based on the raster image. In some examples, the gradients extracted from an image can be stored in a memory unit for reuse.

Image editing interface 700 is an example of, or includes embodiments of, the corresponding element described with reference to FIGS. 2 and 3. Raster image 705 is an example of, or includes aspects of, the corresponding element described with reference to FIG. 5. Vector graphics image 710 is an example of, or includes aspects of, the corresponding element described with reference to FIGS. 5 and 6. In some cases, a raster image may be referred to as an original image. A vector graphics image may be referred to as a reconstructed image. Focal point 715 is an example of, or includes aspects of, the corresponding element described with reference to FIGS. 6, 9, and 10.

Color stop identification component 235 shown in FIG. 2 computes a set of candidate color stops and identifies first color stop 720 and second color stop 725 from the set of candidate color stops. First color stop 720 is an example of, or includes aspects of, the corresponding element described with reference to FIG. 6. Second color stop 725 is an example of, or includes aspects of, the corresponding element described with reference to FIG. 6.

Computing Radial Disk Model

Figure 8:
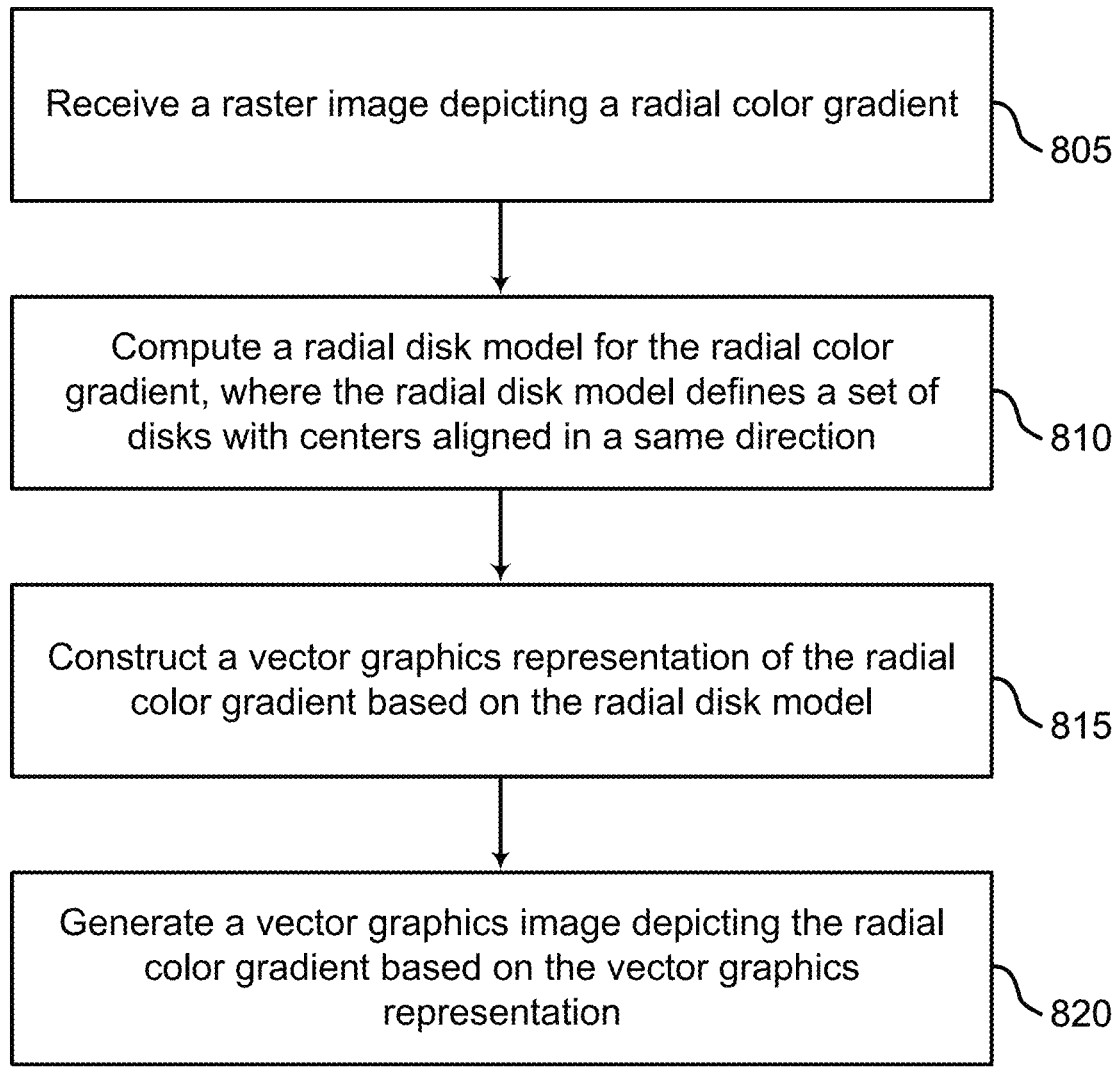
FIG. 8 shows an example of a method for generating a vector graphics image according to embodiments of the present disclosure.

FIG. 8 shows an example of a method for generating a vector graphics image according to embodiments of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system receives a raster image depicting a radial color gradient. In some cases, the operations of this step refer to, or may be performed by, an image editing interface as described with reference to FIGS. 2, 3, and 7. In some examples, a raster image refers to digital images that are defined by the location, size, or color of a set of pixels. The raster image may be in jpeg, gif, or png file format. The quality of a raster image is dependent on the dimension of the image (e.g., number of pixels). For example, a raster image becomes blurred or pixelated due to an increase in size. A radial color gradient refers to a range of colors varying by position from the center of a disk. Radial gradients may be defined using the center of a disk and color stops. The colors can be used to fill a region to produce a smoothly-shaded region.

At operation 810, the system computes a radial disk model for the radial color gradient, where the radial disk model defines a set of disks with centers aligned in a same direction. The radial disk model includes a focal point such that the centers of a set of disks are aligned in the same direction from the focal point. In some cases, the operations of this step refer to, or may be performed by, a radial disk generation component as described with reference to FIGS. 2 and 3. In some embodiments, general radial gradient is based on the focal point, center and outer radius of an enclosing circle, transformation. In some examples, transformation (e.g., scale and rotation) can distort circles to ellipses. Detail regarding disk and the radial disk model are described further in FIG. 9.

At operation 815, the system constructs a vector graphics representation of the radial color gradient based on the radial disk model. In some cases, the operations of this step refer to, or may be performed by, a vector graphics representation component as described with reference to FIGS. 2 and 3. Image processing model 220 as shown in FIG. 2 extract these parameters of a general radial gradient to approximate a smoothly-shaded region of the raster image. In some embodiments, the vector graphics representation includes the radial disk model and color stops. Image processing model 220 processes a region of the raster image as a superpixel and estimates the color field of the superpixel by fitting a general radial gradient. Extracted color gradients are used in the vectorization process to reconstruct a vector graphics image from the raster image.

At operation 820, the system generates a vector graphics image depicting the radial color gradient based on the vector graphics representation. In some cases, the operations of this step refer to, or may be performed by, an image generation component as described with reference to FIGS. 2 and 3. Gradients enable users to create smoothly-shaded graphics. In the vector graphics image, color rings are not limited to concentric rings. In some cases, color rings are not concentric. Colors emerge from one point (e.g., a focal point) and smoothly spread outward (e.g., in a circular shape). The vector graphics image is made up of paths or line objects that are infinitely scalable as they are not dependent on pixels.

Figure 9:
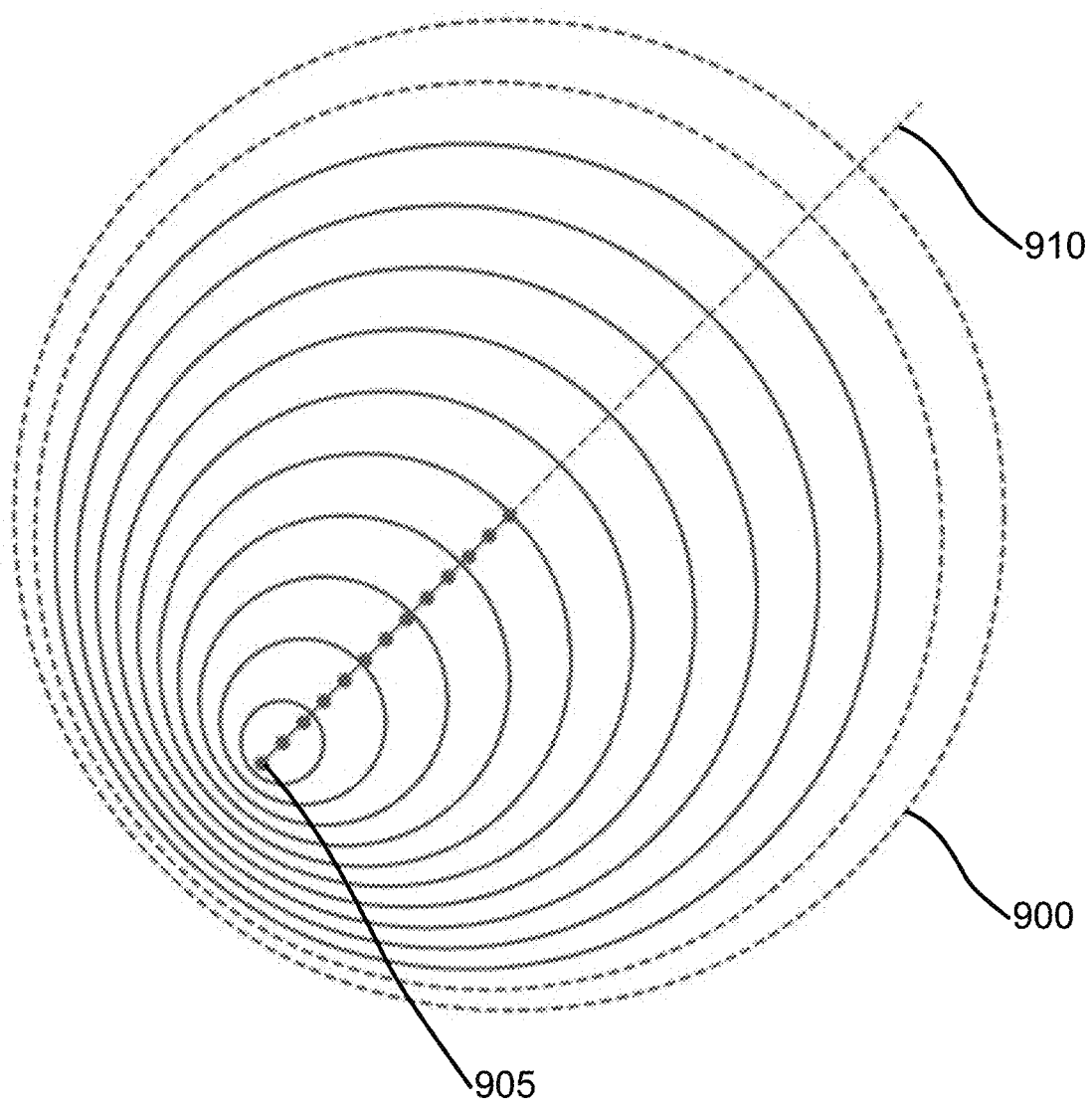
FIG. 9 shows an example of a set of disks according to embodiments of the present disclosure.

FIG. 9 shows an example of a set of disks according to embodiments of the present disclosure. The example shown includes disk 900, focal point 905, and axis of disks 910. The set of disks include rings of color that grow from a single point. Disk 900 is defined by focal point 905 and a radius. Foci of the set of disks lie on axis of disks 910 from focal point 905. Disk 900 is an example of, or includes aspects of, the corresponding element described with reference to FIG. 10. Focal point 905 is an example of, or includes aspects of, the corresponding element described with reference to FIGS. 6, 7, and 10. Axis of disks 910 is an example of, or includes aspects of, the corresponding element described with reference to FIG. 10.

According to an embodiment of the present disclosure, a disk D is defined by a center f and radius r as a subset of $\mathbb{R}^2$. The boundary of a disk $\partial D$ is a circle. A radial disk $\mathfrak{R}$ is a complete set of disks. $\mathfrak{R}$ is an uncountable infinite set with cardinality $\aleph_1$. The completeness of the set mandates the existence of the limit of $\mathfrak{R}$. The limit of the disks in $\mathfrak{R}$ is referred to as the focus of $\mathfrak{R}$. For example, $\hat{f}$ is a point disk with center $\hat{f}$ and radius 0.

According to an embodiment, the radial disk model defines a set of disks with centers aligned in a same direction, e.g., align on axis of disks 910. The radial disk model includes a focal point and an eccentricity vector. In some examples, the eccentricity vector indicates direction and speed of the disks that spread outward. The eccentricity vector corresponds to a quotient of a difference between the centers of the disks and a difference between corresponding radii of the disks.

Figure 10:
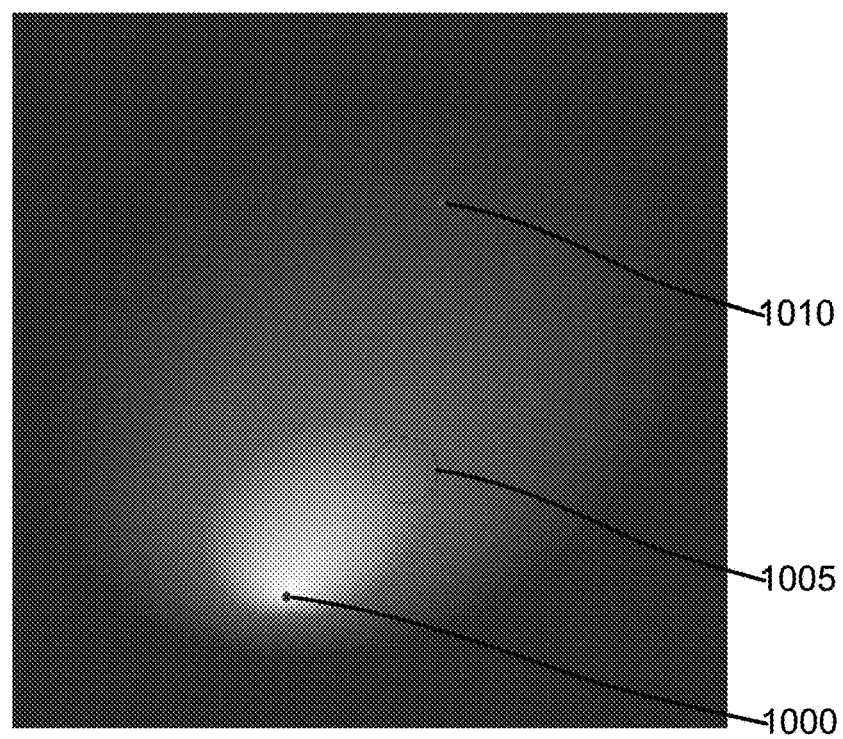
FIG. 10 shows an example of parameter estimation and color equivalence class according to embodiments of the present disclosure.
Figure 10:
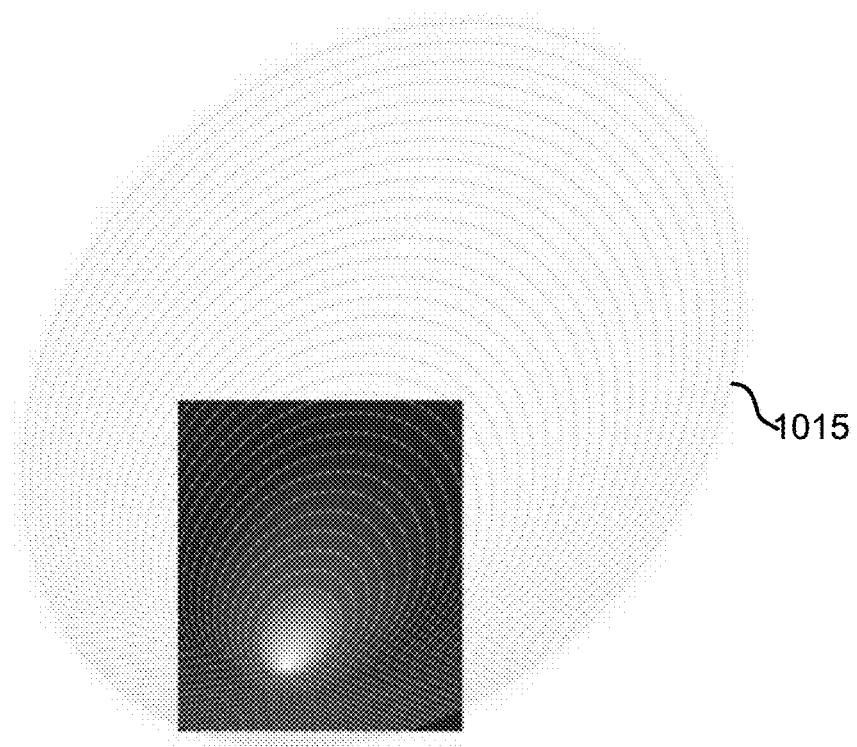

FIG. 10 shows an example of parameter estimation and color equivalence class according to embodiments of the present disclosure. FIG. 10 includes an image on the top and an image on the bottom. The example shown includes focal point 1000, radial color gradient 1005, origin of transform 1010, and disk 1015. In some cases, focal point 1000 is denoted as f̂. Origin of transform 1010 is denoted as ô. The bottom image depicts boundaries of transformed disks including disk 1015.

The image processing apparatus 200 (as shown in FIG. 2) computes a radial disk model for radial color gradient 1005 and a transform function to obtain a vector graphics image including smoothly-shaded regions. The transform function is based on an affine transform for scaling in x-axis and rotation about origin of transform 1010. Focal point 1000 is an example of, or includes aspects of, the corresponding element described with reference to FIGS. 6, 7, and 9. Disk 1015 is an example of, or includes aspects of, the corresponding element described with reference to FIG. 9.

According to an embodiment, disk D is defined by a center f and radius r as a subset of $\mathbb{R}^2$ such that $D:=\{x: \|f-x\|_2 \le r\}$. The boundary of a disk $\partial D$ is a circle. Additionally, radial disk $\mathfrak{R}$ can be a complete set of disks that include ordering and eccentricity. In case of ordered disks, for all $D_1$, $D_2 \in \mathfrak{R}$ with radii $r_1$ and $r_2$, respectively, $r_1 \le r_2$ if and only if $D_1 \subseteq D_2$. Further, for all distinct eccentric disks $D_1, D_2 \in \mathfrak{R}$, with centers $f_1, f_2$ and radii $r_1, r_2$, respectively, the vector $$\hat{e} := \frac{f_1 - f_2}{r_1 - r_2}$$

is referred to as the eccentricity of $\mathfrak{R}$. The limit of the disks in $\mathfrak{R}$, f̂, is referred to as the focus of $\mathfrak{R}$. Details regarding computing focus point and eccentricity vector is described in FIG. 12.

In some examples, lemma 1 relates to scale invariance. Let $\mathfrak{R}$ be a radial disk with focus f̂ and eccentricity ê. $\mathfrak{R}_s$ is obtained from $\mathfrak{R}$ by scaling each disk in $\mathfrak{R}$ by s>0 about the focus f̂. Then, $$\mathfrak{R} = \mathfrak{R}_s$$

Proof is described as follows. For any disk $D \in \mathfrak{R}$ with radius r and focus f there exists a unique disk $D' \in \mathfrak{R}$ with radius r/s and focus f/s. Hence, when D' is scaled by s, D' becomes D which defines the one-to-one relation between $\mathfrak{R}$ and $\mathfrak{R}_s$.

In some examples, lemma 2 states that consider a $\mathfrak{R}$ with focus f̂ and eccentricity ê. For any disk $D \in \mathfrak{R}$, with center $\hat{f}_D$ and radius $r_D$, $$\hat{f}_D = \hat{f} + r_D \hat{e} \quad (1)$$

Proof is described as follows. The limit disk of the sequence has a radius 0 and center f̂. The lemma follows by substituting f̂ for $f_2$ in above equation $$\hat{e} := \frac{f_1 - f_2}{r_1 - r_2}.$$

Additionally, corollary 1 states that the foci of the disks of $\mathfrak{R}$ lie on a ray starting from f̂ along ê. The ray is referred to as the axis of $\mathfrak{R}$.

According to some embodiments, general radial gradient is defined by a focal center, eccentricity vector, and transform function. Focal center f̂ defines the position of the inner most radial circle (or ellipse). Eccentricity vector is represented by ê. Transform function T defines the affine transform for scaling in x-axis and rotation about a center ô. Let the space $\mathcal{J}$ represent the observable image space, and the space I represent the isometric un-rotated space before the transformation. Hence, f̂, ê and ô are defined in I. The linear transform T is applied about ô to get $\mathcal{J}$ after a radial gradient is created in I.

Figure 11:
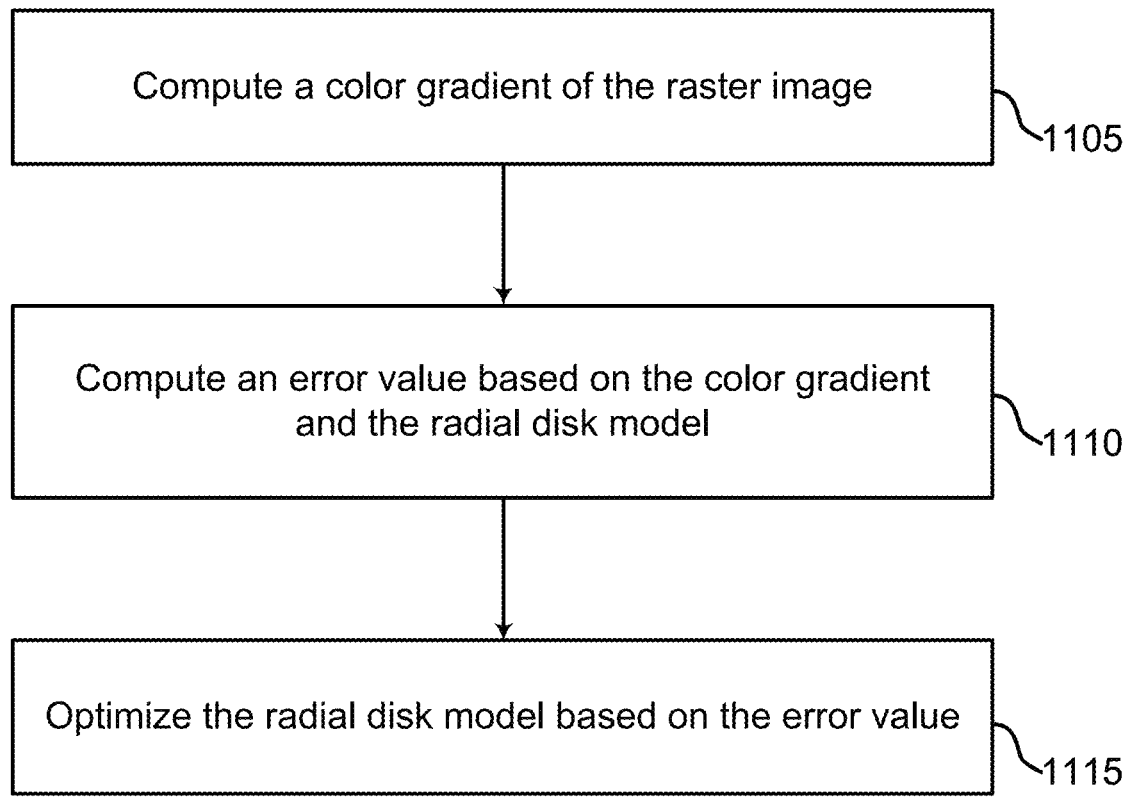
FIG. 11 shows an example of a method for optimizing a radial disk model according to embodiments of the present disclosure.

FIG. 11 shows an example of a method for optimizing a radial disk model according to embodiments of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system computes a color gradient of the raster image. In some cases, the operations of this step refer to, or may be performed by, a radial disk generation component as described with reference to FIGS. 2 and 3.

According to an embodiment of the present disclosure, general radial gradient can be extracted from a superpixel. A superpixel refers to 2D regions in space. A superpixel $\mathfrak{S}$ can be a closed, complete set of points in $\mathbb{R}^2$. The color of a pixel $p \in \mathfrak{S}$ is $C(p) = [C_R \; C_G \; C_B]$ denotes the three color channels. Color gradient from a vector field defining the change in color intensity is given in Eq 2.

$$dC = [\overrightarrow{dC_R} \; \overrightarrow{dC_G} \; \overrightarrow{dC_B}] = \quad (2)$$
$$\left[\left(\frac{\partial C_R}{\partial x}, \frac{\partial C_R}{\partial y}\right) \left(\frac{\partial C_G}{\partial x}, \frac{\partial C_G}{\partial y}\right) \left(\frac{\partial C_B}{\partial x}, \frac{\partial C_B}{\partial y}\right)\right]$$

The color gradient form can be calculated numerically using spatial difference operators, e.g., a Sobel operator. Image processing apparatus 200 eliminates the presence of other kinds of fill types before estimating the generalized radial parameters. A solid fill is detected by observing the sample variance $S^2(C(p)) < \epsilon$; $p \in \mathfrak{S}$, since the change in color intensity for a solid fill is negligible. Linear gradients are ascertained by reconstructing the linear gradient and examining the pixel loss.

General radial gradient color refers to a pattern with rings of color that grow from a single point. A general radial gradient is described by a focal center, eccentricity, and a transform function. Focal center f̂ defines the position of the inner most radial circle (or ellipse). Eccentricity is represented by the eccentricity ê. Transform T defines the affine transform for scaling in x-axis and rotation about a center ô.

In some cases, a general radial gradient color (i.e., change in color intensity) is defined with a color ramp $\Gamma: \mathbb{R}_{\ge 0} \to \mathbb{C}$, where $\mathbb{C}$ is the color space. The color of any point p for a general radial gradient color of a given radial disk $\mathfrak{R}$ is defined as $\Gamma(r)$, where r is the radius of the disk $D \in \mathfrak{R}$ such that $\partial D$ passes through p. Further, an affine transform has a center $f_i$ as origin.

At operation 1110, the system computes an error value based on the color gradient and the radial disk model. In some cases, the operations of this step refer to, or may be performed by, a radial disk generation component as described with reference to FIGS. 2 and 3.

According to an embodiment of the present disclosure, image processing model 220 computes or updates the radial gradient parameters based on the following theorem. Theorem 1 states that for a general radial color gradient $\mathfrak{R}$ with focus $\hat{f}$, eccentricity $\hat{e}$, and transform T about a point o, the color gradient (i.e., change in color intensity) at a point p is given by G(p), where:

$$G(p) \propto T \cdot (\hat{p} - \hat{f}_D) \quad (3)$$

where $\hat{p}$ is $T^{-1}(p-o)+o$ and $\hat{f}_D$ is the center of the disk D such that the circle $\partial D$ passes through $\hat{p}$.

The proof is as follows. Let $\Gamma$ be an appropriate color ramp, T is identity, i.e., space I is same as space $\mathcal{J}$, and hence $\hat{p}$ is p. Let D be a disk with center $\hat{f}_{\hat{p}}$ such that $\partial D$ passes through $\hat{p}$. Thus, color at $\hat{p}$ is defined as $\Gamma(\|\hat{p} - \hat{f}_{\hat{p}}\|_2)$.

$$\hat{G}(\hat{p}) = \nabla \Gamma(\|\hat{p} - \hat{f}_{\hat{p}}\|_2)$$

$$\propto \frac{1}{\|\hat{p} - \hat{f}_{\hat{p}}\|_2} \cdot \left( (\hat{p}_x - \hat{f}_{\hat{p},x}) \frac{\partial}{\partial x} + (\hat{p}_y - \hat{f}_{\hat{p},y}) \frac{\partial}{\partial y} \right)$$

$$\propto (\hat{p} - \hat{f}_D)$$

In some cases when T is not identity, T is applied post color assignment. Consider any arbitrary point $p \in \mathcal{J}$. Let $\hat{p} \in I$ be the corresponding point which yields p after the transformation. Hence color gradient at $p \in \mathcal{J}$ is the transformed gradient at $\hat{p} \in I$. The relation between p and $\hat{p}$ is defined as $\hat{p} = T^{-1} \cdot (p-o) + o$. The color gradient in space I is mapped to the gradient in space $\mathcal{J}$ as:

$$G(p) = T \cdot \hat{G}(\hat{p})$$

$\hat{G}(\hat{p})$ is a vector and linear transform T is applicable. $G(\hat{p})$ is defined in space I. Thus, the parameters are computed based on Theorem 1 (see Eq. 3 above). The color gradient is constructed using Theorem 1 for any choice of $\hat{f}$, $\hat{e}$, and T.

At operation 1115, the system optimizes the radial disk model based on the error value. In some cases, the operations of this step refer to, or may be performed by, a radial disk generation component as described with reference to FIGS. 2 and 3.

According to an embodiment, a mis-alignment energy is defined to quantify the difference between the constructed gradient G(p) and the observed gradient $\overrightarrow{dC}(p)$. In some embodiments, the center about which transform T is applied lies on the axis of $\mathfrak{R}$, hence is uniquely determined by a radius, $r_0$. Additionally, the scale invariant property (lemma 1) enables image processing model 220 to choose any $r_0 > 0$. Accordingly, trainable variables are $\hat{f}$, $\hat{e}$, and linear transform T.

$$E_p(\hat{f}, \hat{e}, T) := \overrightarrow{dC}(p) \cdot \perp \cdot G(p) \quad (4)$$

$$\approx \overrightarrow{dC}(p) \cdot \perp \cdot T \cdot (\hat{p} - \hat{f}_D)$$

The variable $\hat{f}_D$, which is the center of the disk D with boundary $\partial D$ passing through $\hat{p}$, is a dependent variable. The value of $\hat{f}_D$ for a point $\hat{p}$ can be calculated from $\hat{f}$ and $\hat{e}$. Let r be the radius of the disk D which provides:

$$\|\hat{p} - \hat{f}_D\|^2 = r^2$$

$$\|\hat{p} - \hat{f} - r \cdot \hat{e}\|^2 = r^2$$

$$(\|\hat{e}\|^2 - 1) \cdot r^2 - 2 \cdot (\hat{p} - \hat{f}) \cdot \hat{e} \cdot r + \|\hat{p} - \hat{f}\|^2 = 0 \quad (5)$$

Equation 5 is solved for r, and thus $\hat{f}_D$ can be calculated using lemma 2. The value of the parameters can be estimated by optimizing least square error (LSE) of the energy function defined in equation 4 above.

Figure 12:
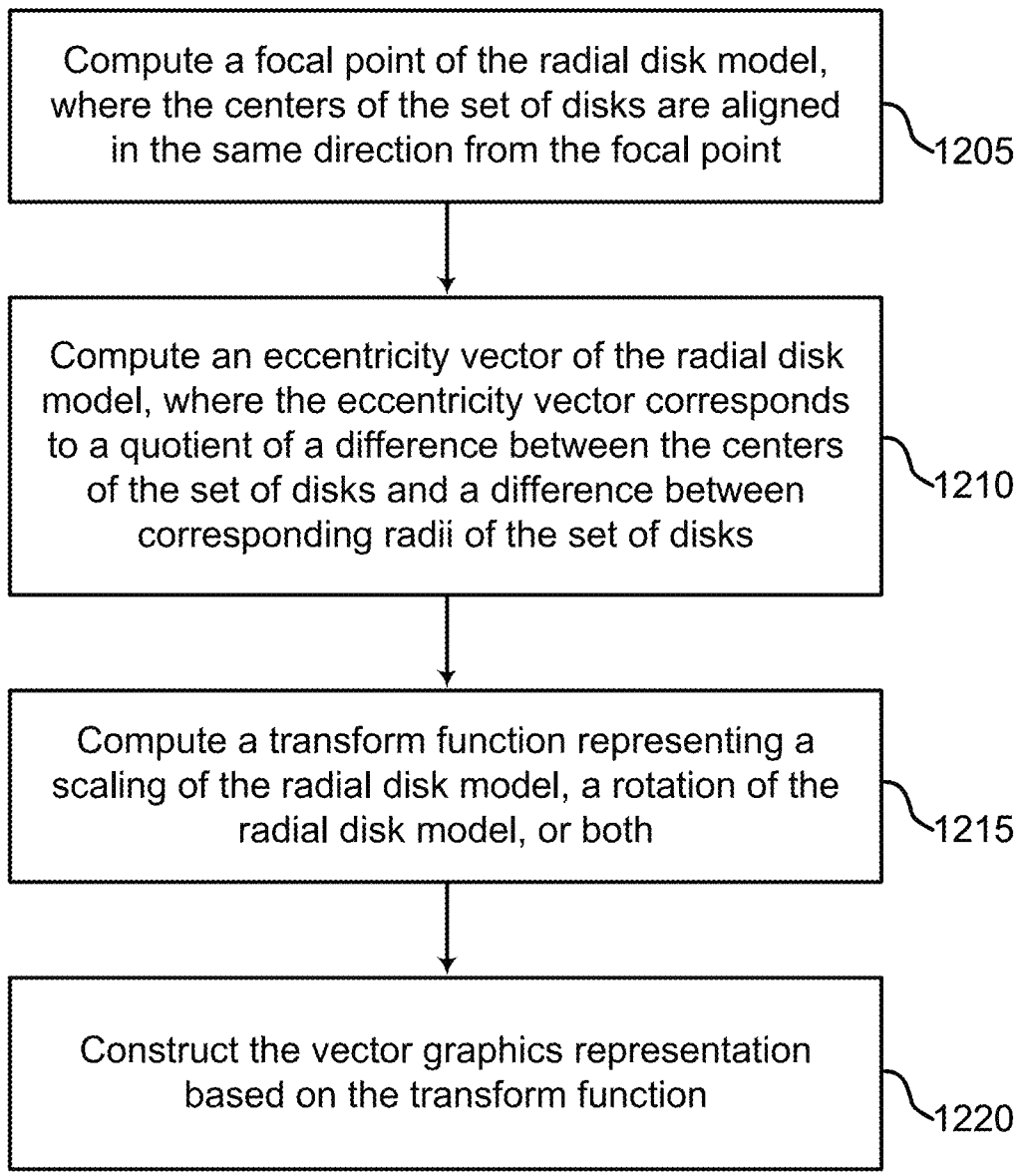
FIG. 12 shows an example of a method for computing a sum of orthogonality measures according to embodiments of the present disclosure.

FIG. 12 shows an example of a method for computing a sum of orthogonality measures according to embodiments of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1205, the system computes a focal point of the radial disk model, where the centers of the set of disks are aligned in a same direction from the focal point. In some cases, the operations of this step refer to, or may be performed by, a radial disk generation component as described with reference to FIGS. 2 and 3. According to an embodiment of the present disclosure, a disk D is defined by a center f and radius r as a subset of $\mathbb{R}^2$ such that:

$$D := \{x : \|f - x\|_2 \leq r\}$$

The boundary of a disk $\partial D$ is a circle. The limit of the disks in $\mathfrak{R}$, $$\hat{f} := \bigcap_{D \in R} D$$

Here, $\hat{f}$ is referred to as the focus of $\mathfrak{R}$. In an embodiment, $\hat{f}$ is a point disk with center $\hat{f}$ and radius 0.

At operation 1210, the system computes an eccentricity vector of the radial disk model, where the eccentricity vector corresponds to a quotient of a difference between the centers of the set of disks and a difference between corresponding radii of the set of disks. In some cases, the operations of this step refer to, or may be performed by, a radial disk generation component as described with reference to FIGS. 2 and 3.

According to an embodiment, a radial disk $\mathfrak{R}$ is a complete set of disks that are ordered and eccentric. Regarding the ordered aspect, for disks $D_1, D_2 \in \mathfrak{R}$ with radii $r_1$ and $r_2$, respectively, $r_1 \leq r_2$ if and only if $D_1 \subseteq D_2$. Regarding the eccentricity aspect, for distinct disk $D_1, D_2 \in \mathfrak{R}$, with centers $f_1, f_2$ and radii $r_1, r_2$, respectively, the vector $\hat{e}$ is formulated as follows:

$$\hat{e} := \frac{f_1 - f_2}{r_1 - r_2} \quad (6)$$

Here, $\hat{e}$ is a constant. $\hat{e}$ is referred to as the eccentricity of $\mathfrak{R}$. $\mathfrak{R}$ is an uncountable infinite set with cardinality $\aleph_1$. The completeness of the set mandates the existence of the limit of $\mathfrak{R}$.

At operation 1215, the system computes a transform function representing a scaling of the radial disk model, a rotation of the radial disk model, or both. In some cases, the operations of this step refer to, or may be performed by, a radial disk generation component as described with reference to FIGS. 2 and 3. In some cases, transform function T defines the affine transform for scaling in x-axis and rotation about a center ô. For example, let the space $\mathcal{J}$ represent the observable image space, and the space I represent the isometric un-rotated space before the transformation. Hence, f̂, ê and ô are defined in I. The linear transform T is applied about ô to get $\mathcal{J}$ after a radial gradient is created in I.

At operation 1220, the system constructs the vector graphics representation based on the transform function. In some cases, the operations of this step refer to, or may be performed by, a radial disk generation component as described with reference to FIGS. 2 and 3.

Generating Color Stop

Figure 13:
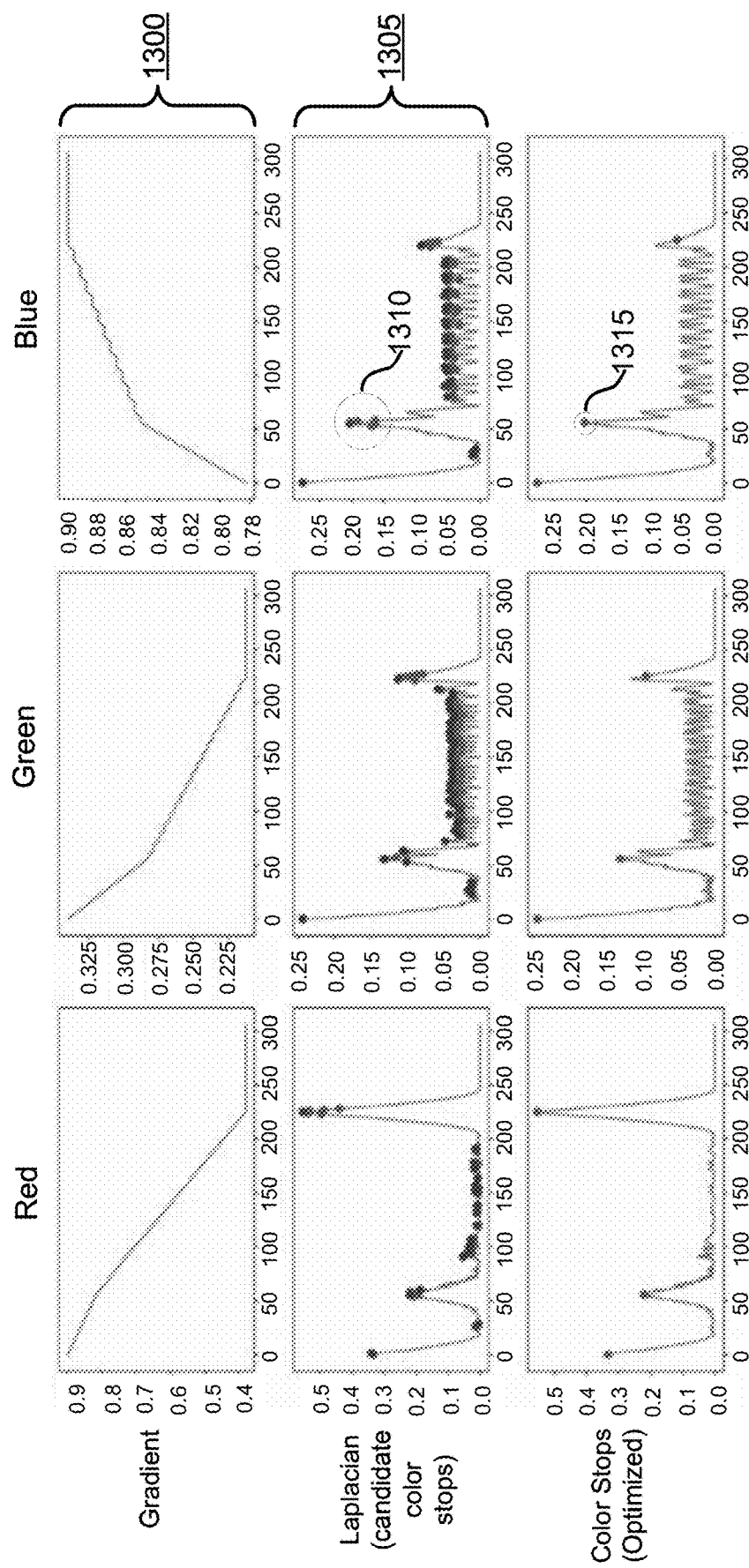
FIG. 13 shows an example of radial color gradient and color stops according to embodiments of the present disclosure.

FIG. 13 shows an example of radial color gradient and color stops according to embodiments of the present disclosure. The example shown includes color intensity function 1300, Laplacian diagram 1305, candidate color stops 1310, and color stop 1315. For example, color intensity function 1300 represents a change in color intensity or color gradient based on a vector field. A Laplacian filter is applied to the color profile to identify sharp changes or peaks indicating the presence of color stop 1315 in a Laplacian diagram 1305. In an example as shown in FIG. 13, the first row includes color gradient of the respective channel of the three channels (red, green, and blue). The second row shows Laplacian diagram 1305 that indicates a set of candidate color stops 1310. The third row shows that one of candidate color stops 1310 is selected as color stop 1315.

According to an embodiment of the present disclosure, image processing model 220 estimates the color stops (and respective positions of the color stops) of the radial gradient with focus f̂, eccentricity ê, linear transform T, and origin of transform ô. For example, points that lie on the boundary of the same disk have the same color values. Two points $p_0, p_1 \in \mathcal{J}$ are color equivalent if and only if $$p_1 \sim p_2 := \exists D \in \mathfrak{R} : \hat{p}_0, \hat{p}_1 \in \partial D$$

where $\hat{p}_i = T^{-1} \cdot (p_i - \hat{o}) + \hat{o}f$ or $i \in \{0, 1\}$ (7)

where ~ is an equivalence relation and $\Omega$ is the equivalence class.

Each element of the equivalence class $\Omega$ is the boundary of a transformed disk transformed in space $\mathcal{J}$. A total order is defined on $\Omega$ by the radii of the disks. A color profile function is defined $F: \Omega \rightarrow \mathbb{R}^3$:

$$F([p]) := \sum_{q \in [p]} w_q \cdot C(q) \quad (8)$$

where $w_q$ is a weight function. In some examples, the points that are not in the direction of eccentricity ê are brought together, and hence weights of sampled colors from the pixels are discounted.

According to an embodiment, the color profile on $\Omega$ for the three channels shows that any two points $p_0, p_1$ with $p_0 \sim p_1$ have the same color. Additionally, the color profile is defined as an average color of the equivalence class. The colors between two stops (e.g., $s_l, s_r$) are a linear blend of the colors at the stops $(s_l, s_r)$. Hence, sharp changes in the slope of the color profile indicate the presence of a color stop. A Laplacian filter is applied on the color profile to identify the sharp changes since the value of the Laplacian at the points are peaks in a plotted graph. The points are marked as color stops.

$$C(S) = \{F([p]) : [p] \in S\} \quad (9)$$

Figure 14:
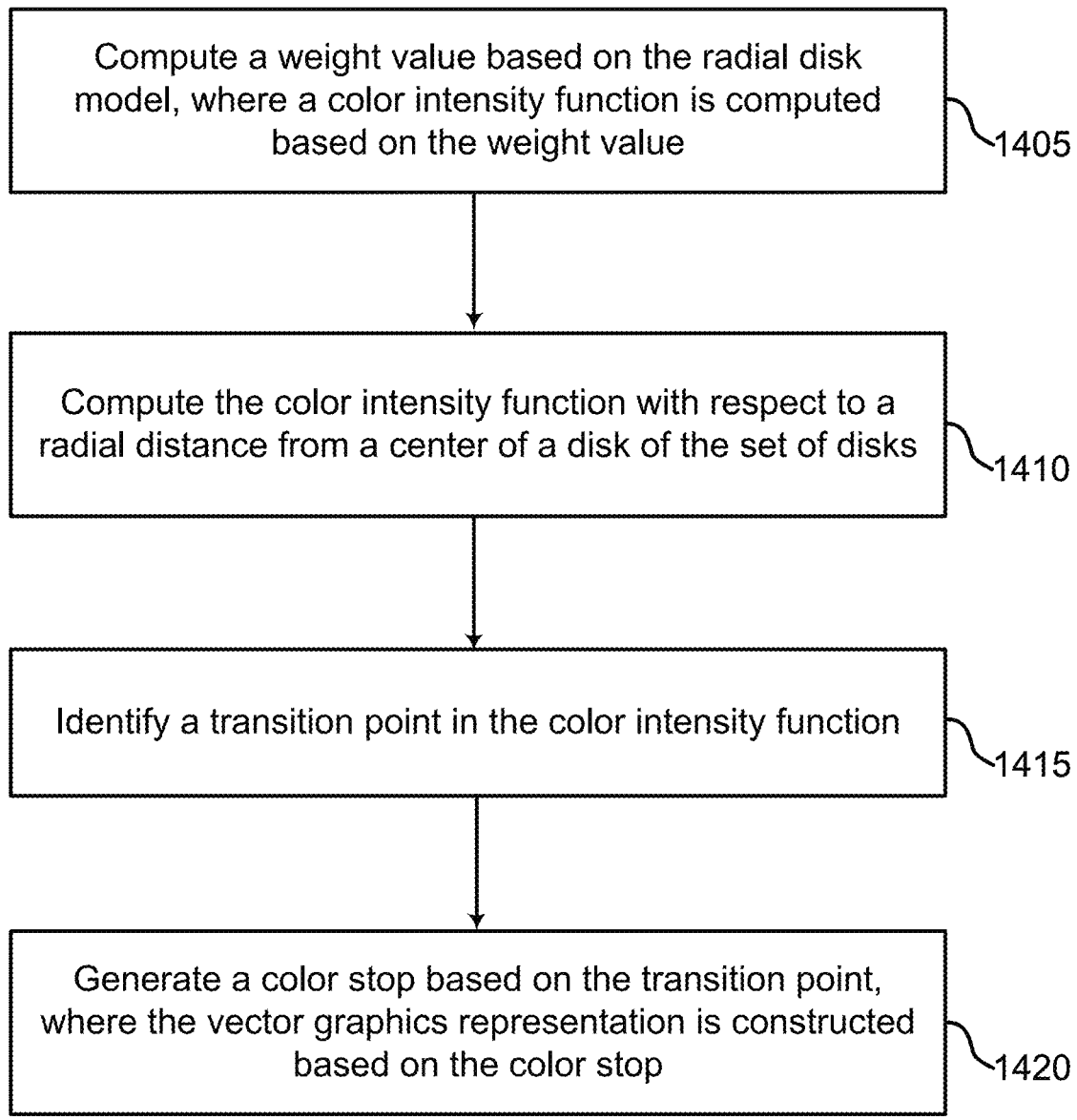
FIG. 14 shows an example of a method for generating a color stop according to embodiments of the present disclosure.

FIG. 14 shows an example of a method for generating a color stop according to embodiments of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1405, the system computes a weight value based on the radial disk model, where a color intensity function is computed based on the weight value. In some cases, the operations of this step refer to, or may be performed by, a color stop identification component as described with reference to FIG. 2.

According to an embodiment of the present disclosure, the points that are not in the direction of ê are squished together, and weights of sampled colors from these pixels are discounted. Consider an equivalence class at a point p, i.e., [p]. Let D with center $\hat{f}_D$ be the corresponding unique disk, such that $[\hat{p}] \subseteq \partial D$. Let $C_{[p]}$ be the complex plane with $f_D$ as center of the disk D. Let the unit complex number along the axis ê be $e^{i\hat{\theta}}$. For any $q \in [p]$, such that $$\hat{q} = r_q e^{i\theta_q},$$

let $$\bar{w}_q = e^{-\lambda \|\hat{e}\| (\hat{\theta} - \theta_q)^2}$$

where $\lambda$ is a positive constant. The weights are normalized as follows:

$$w_q = \frac{\bar{w}_q}{\sum_{p' \in [p]} \bar{w}_{p'}}$$

such that the normalized weights sum up to 1. The weight function assigns higher importance to the points that are in the direction of ê, and the rate of decay is dependent on the magnitude of ê.

At operation 1410, the system computes the color intensity function with respect to a radial distance from a center of a disk of the set of disks. In some cases, the operations of this step refer to, or may be performed by, a color stop identification component as described with reference to FIG. 2. For example, a general radial color gradient $\mathfrak{R}$ with focus f̂, eccentricity ê, and transform T about a point o, the color gradient (i.e., change in color intensity) at a point p is formulated as G(p) with reference to FIG. 11.

At operation 1415, the system identifies a transition point in the color intensity function. In some cases, the operations of this step refer to, or may be performed by, a color stop identification component as described with reference to FIG. 2. For example, the transition point includes colors between two color stops (e.g., $s_l, s_r$) that are a linear blend of the colors at the color stops $(s_l, s_r)$.

At operation 1420, the system generates a color stop based on the transition point, where the vector graphics representation is constructed based on the color stop. In some cases, the operations of this step refer to, or may be performed by, a color stop identification component as described with reference to FIG. 2.

According to an embodiment, color stop identification component 235 shown in FIG. 2 is configured to estimate the color stops (and respective positions of the color stops) of the radial gradient. Color stop identification component 235 identifies multiple candidate transition points such that a peak estimate yields redundant stops. A clustering algorithm that uses rolling (sliding) window classifies stops that are close to one another as a single stop. In some examples, three color stops are considered co-linear if they lie on the same line in the color space. The degree of non co-linearity of three color stops is measured as follows:

$$\text{Non-Co-linearity}(p_0,p_1,p_2):=|\|C(p_1)-C(p_0)\|^2+\|C(p_1)-C(p_2)\|^2-\|C(p_0)-C(p_2)\|^2| \qquad (10)$$

where the color C(p) is F([p]). The color stops for which the degree of non-co-linearity is small are eliminated because the color variation at such a candidate color stop can be interpolated by the neighboring points. Finally, the gradient line (or ramp) is placed in any direction starting from origin o after determining the distance of the color stops from the origin.

Figure 15:
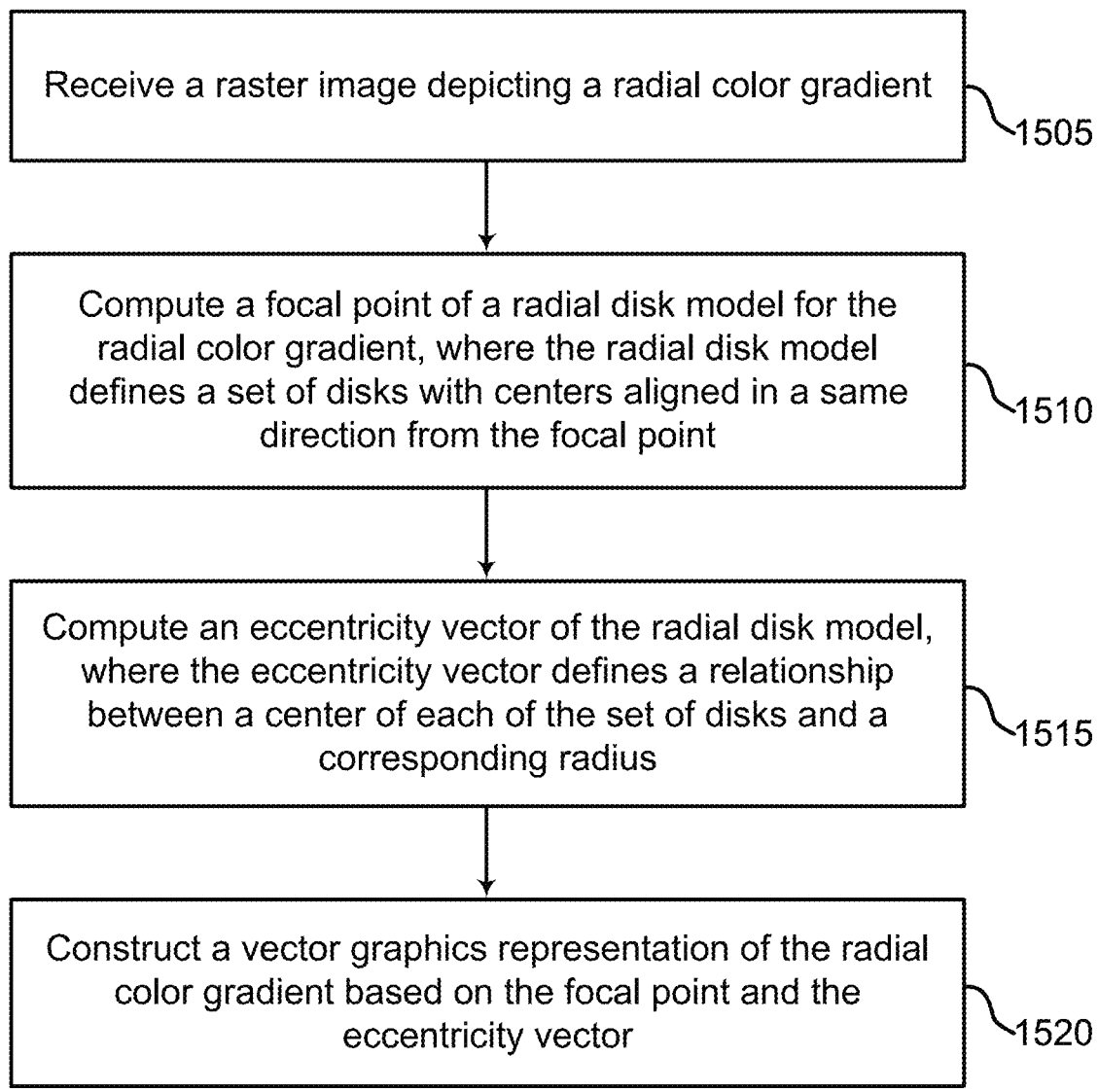
FIG. 15 shows an example of a method for generating a vector graphics image according to embodiments of the present disclosure.

FIG. 15 shows an example of a method for generating a vector graphics image according to embodiments of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1505, the system receives a raster image depicting a radial color gradient. In some cases, the operations of this step refer to, or may be performed by, an image editing interface as described with reference to FIGS. 2, 3, and 7. Raster images are compiled using pixels or dots and they are resolution dependent. The quality of raster images depends on the number of pixels displayed in a certain area of the images. In some examples, a raster image refers to digital images that have a jpeg, gif, or png file format. A raster image is defined by location, size, and/or color of a set of pixels. The quality of a raster image depends on the dimensions of the image. In some cases, radial color gradient refers to a range of colors varying by the corresponding position from a center point of a disk.

At operation 1510, the system computes a focal point of a radial disk model for the radial color gradient, where the radial disk model defines a set of disks with centers aligned in a same direction from the focal point. In some cases, the operations of this step refer to, or may be performed by, a radial disk generation component as described with reference to FIGS. 2 and 3. For example, a focal point is to a point where the centers of a set of disks are aligned in a same direction from the focal point. Thus, colors emerge from a focal point and smoothly spread outwards (e.g., in circular shape). According to an embodiment, a disk D is defined by a focal point f and radius r as a subset of $\mathbb{R}^2$ such that $D:=\{x:\|f-x\|_2 \leq r\}$.

At operation 1515, the system computes an eccentricity vector of the radial disk model, where the eccentricity vector defines a relationship between a center of each of the set of disks and a corresponding radius. In some cases, the operations of this step refer to, or may be performed by, a radial disk generation component as described with reference to FIGS. 2 and 3. According to some embodiments, the eccentricity vector indicates direction and speed of the disks that spread outward. For example, the eccentricity vector corresponds to a quotient of a difference between the centers of the disks and a difference between corresponding radii of the disks. For two distinct eccentric disks $D_1$, $D_2 \in \mathfrak{R}$, with centers $f_1$, $f_2$ and radii $r_1$, $r_2$, respectively, the vector $$\hat{e} := \frac{f_1 - f_2}{r_1 - r_2}$$

is referred to as the eccentricity of $\mathfrak{R}$.

At operation 1520, the system constructs a vector graphics representation of the radial color gradient based on the focal point and the eccentricity vector. In some cases, the operations of this step refer to, or may be performed by, a vector graphics representation component as described with reference to FIGS. 2 and 3. Vector graphics representation component 240 generates a vector graphics representation based on the raster image. The vector graphics representation includes a radial disk model for a radial color gradient and color stops. The radial disk model includes a focal point and an eccentricity vector.

According to an embodiment, image processing model 220 (with regards to FIG. 2) computes a transform function representing a scaling of the radial disk model, a rotation of the radial disk model, or both. The vector graphics representation is constructed based on the transform function. Image processing model 220 generates a vector graphics image based on the vector graphics representation. According to an embodiment, image processing model 220 reconstructs the vector graphics image from a raster image based on the radial disk model.

Performance of apparatus, systems and methods of the present disclosure have been evaluated, and results indicate embodiments of the present disclosure have obtained increased performance over existing technology. Example experiments demonstrate that image processing apparatus 200 of the present disclosure outperforms conventional systems.

According to an embodiment, image processing apparatus 200 perform transformations such as scaling or rotation. The reconstruction of radial gradients is built on the assumption that an input image is approximated by radial gradients. Radial gradient approximation is validated by checking whether pixel-wise difference (L2-norm) of the reconstructed radial gradient with respect to the input image is within an acceptable limit.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
receiving a raster image depicting a radial color gradient;
computing a radial disk model for the radial color gradient, wherein the radial disk model defines a plurality of disks with centers aligned in a same direction;
computing an eccentricity vector of the radial disk model, wherein the eccentricity vector corresponds to a quotient of a difference between the centers of the plurality of disks and a difference between corresponding radii of the plurality of disks;
constructing a vector graphics representation of the radial color gradient based on the radial disk model and the eccentricity vector; and
generating a vector graphics image depicting the radial color gradient based on the vector graphics representation.

2. The method of claim 1, further comprising:
computing a focal point of the radial disk model, wherein the centers of the plurality of disks are aligned in the same direction from the focal point.

3. The method of claim 1, further comprising:
computing a transform function representing a scaling of the radial disk model, a rotation of the radial disk model, or both, wherein the vector graphics representation is constructed based on the transform function.

4. The method of claim 1, further comprising:
computing a color gradient of the raster image;
computing an error value based on the color gradient and the radial disk model; and
optimizing the radial disk model based on the error value.

5. The method of claim 4, further comprising:
computing a first color gradient corresponding to a first color channel of a plurality of color channels;
computing a second color gradient corresponding to a second color channel of the plurality of color channels; and
computing a third color gradient corresponding to a third color channel of the plurality of color channels, wherein the error value is based on the first color gradient, the second color gradient, and the third color gradient.

6. The method of claim 4, further comprising:
computing a vector field of color gradients including the color gradient, wherein the error value is based on the vector field of color gradients.

7. The method of claim 4, further comprising:
computing an energy function based on the color gradient and the radial disk model, wherein the error value corresponds to a least square error (LSE) of the energy function.

8. The method of claim 1, further comprising:
computing a color intensity function with respect to a radial distance from a center of a disk of the plurality of disks;
identifying a transition point in the color intensity function; and
generating a color stop based on the transition point, wherein the vector graphics representation is constructed based on the color stop.

9. The method of claim 8, further comprising:
computing a weight value based on the radial disk model, wherein the color intensity function is computed based on the weight value.

10. The method of claim 1, further comprising:
receiving a user input;
modifying the radial disk model based on the user input; and
generating an updated vector graphics image based on the modified radial disk model.

11. A non-transitory computer readable medium storing code for image processing, the code comprising instructions that, when executed by at least one processor, cause the at least one processor to perform operations comprising:
receiving a raster image depicting a radial color gradient;
computing a radial disk model for the radial color gradient, wherein the radial disk model defines a plurality of disks with centers aligned in a same direction;
computing a color gradient of the raster image;
computing an error value based on the color gradient and the radial disk model;
computing an energy function based on the color gradient and the radial disk model, wherein the error value corresponds to a least square error (LSE) of the energy function;
optimizing the radial disk model based on the error value;
constructing a vector graphics representation of the radial color gradient based on the optimized radial disk model; and
generating a vector graphics image depicting the radial color gradient based on the vector graphics representation.

12. The non-transitory computer readable medium of claim 11, the code further comprising instructions executable by the at least one processor to perform operations comprising:
displaying the vector graphics image depicting the radial color gradient based on the vector graphics representation.

13. The non-transitory computer readable medium of claim 11, the code further comprising instructions executable by the at least one processor to perform operations comprising:
computing a transform function representing a scaling of the radial disk model, a rotation of the radial disk model, or both, wherein the vector graphics representation is constructed based on the transform function.

14. The non-transitory computer readable medium of claim 11, the code further comprising instructions executable by the at least one processor to perform operations comprising:
computing a color intensity function with respect to a radial distance from a center of a disk of the plurality of disks;
identifying a transition point in the color intensity function; and
generating a color stop based on the transition point, wherein the vector graphics representation is constructed based on the color stop.

15. A system comprising:
a memory component; and
a processing device coupled to the memory component, the processing device configured to perform operations comprising:
receiving a raster image depicting a radial color gradient;
computing a radial disk model for the radial color gradient, wherein the radial disk model defines a plurality of disks with centers aligned in a same direction;
computing an eccentricity vector of the radial disk model, wherein the eccentricity vector corresponds to a quotient of a difference between the centers of the plurality of disks and a difference between corresponding radii of the plurality of disks;
constructing a vector graphics representation of the radial color gradient based on the radial disk model and the eccentricity vector; and
generating a vector graphics image depicting the radial color gradient based on the vector graphics representation.

16. The system of claim 15, wherein:

the radial disk model comprises a focal point, the eccentricity vector, a transform function, or any combination thereof.

17. The system of claim 15, further comprising:

a color stop identification component configured to compute a color stop based on a color intensity function with respect to a radial distance from a center of a disk of the plurality of disks.

18. The system of claim 15, further comprising:

an image editing interface configured to receive the raster image depicting the radial color gradient.

* * * * *